United States Patent
Xu et al.

(10) Patent No.: US 12,294,830 B2
(45) Date of Patent: May 6, 2025

(54) DEVICE DETECTION METHOD AND TERMINAL

(71) Applicant: Honor Device Co., Ltd., Shenzhen (CN)

(72) Inventors: Jianfeng Xu, Shenzhen (CN); Huaming Chen, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/268,460

(22) PCT Filed: Dec. 20, 2022

(86) PCT No.: PCT/CN2022/140184
§ 371 (c)(1),
(2) Date: Jun. 20, 2023

(87) PCT Pub. No.: WO2023/160168
PCT Pub. Date: Aug. 31, 2023

(65) Prior Publication Data
US 2024/0388838 A1    Nov. 21, 2024

(30) Foreign Application Priority Data
Feb. 24, 2022    (CN) .......................... 202210176042.5

(51) Int. Cl.
*H04R 1/28*    (2006.01)
(52) U.S. Cl.
CPC ....... *H04R 1/2873* (2013.01); *H04R 2460/13* (2013.01); *H04R 2499/11* (2013.01)

(58) Field of Classification Search
CPC .............. H04R 1/2873; H04R 2499/11; H04R 2460/13; H04R 29/001; H04R 29/00; H04R 3/12
USPC ............................................... 381/59, 89, 55
See application file for complete search history.

(56) References Cited

U.S. PATENT DOCUMENTS

| | | |
|---|---|---|
| 2015/0084902 A1 | 3/2015 | Atsumi |
| 2019/0052741 A1 | 2/2019 | Shim et al. |
| 2020/0348902 A1 | 11/2020 | Park et al. |
| 2022/0020370 A1 | 1/2022 | Hurwitz |

FOREIGN PATENT DOCUMENTS

| | | | | |
|---|---|---|---|---|
| CN | 109032556 A | 12/2018 | | |
| CN | 109086022 A | 12/2018 | | |
| CN | 110191221 A | 8/2019 | | |
| CN | 110868683 A | 3/2020 | | |
| CN | 113973149 A | 1/2022 | | |
| CN | 109254689 B | 2/2022 | | |
| CN | 115686425 A | * 2/2023 | ............. | G06F 3/165 |

* cited by examiner

*Primary Examiner* — David L Ton
(74) *Attorney, Agent, or Firm* — Leydig, Voit & Mayer, Ltd.

(57) ABSTRACT

A device detection method and a terminal are provided. The method may be used to detect whether a screen sound generator is damaged. When determining that the screen sound generator is damaged, a terminal may use some manners to eliminate adverse impact (for example, the foregoing impact that noise is carried when an audio signal is played) caused due to damage of the screen sound generator.

15 Claims, 20 Drawing Sheets

DEVICE DETECTION METHOD AND TERMINAL

CROSS-REFERENCE TO RELATED APPLICATIONS

This application is a national stage of International Application No. PCT/CN2022/140184, filed on Dec. 20, 2022, which claims priority to Chinese Patent Application No. 202210176042.5, filed on Feb. 24, 2022. The disclosures of both of the aforementioned applications are hereby incorporated by reference in their entireties.

TECHNICAL FIELD

This application relates to the field of terminals and audio processing technologies, and in particular, to a device detection method and a terminal.

BACKGROUND

With continuous development of terminals, a user has an increasingly high requirement on a screen-to-body ratio of the terminal. In the current development phase, most terminals are full-screen terminals, that is, an entire front of the terminal is a screen. When the terminal is a full-screen terminal, an earpiece can be disposed only on a side surface of the terminal. When the user listens to a sound by using the terminal, a screen of the terminal instead of the side surface with the earpiece usually faces the auricle. In such a case, because the earpiece is located on the side surface, but the auricle of the user faces the screen, when the auricle of the user listens to a sound, the earpiece causes sound leakage, and a problem that an unclear sound is heard is likely to occur.

To resolve the problem of sound leakage and the problem that an unclear sound is heard, and to improve quality of an audio signal played by the terminal, a sound generator other than the earpiece may be added to the terminal. This additional sound generator may be disposed inside the screen of the terminal, and may also be referred to as a screen sound generator. The screen sound generator usually faces the auricle when playing an audio signal, to alleviate the problem of sound leakage and the problem that an unclear sound is heard.

SUMMARY

This application provides a device detection method and a terminal. In the method, when determining that a screen sound generator is damaged, a terminal can no longer play an audio signal through the screen sound generator, to resolve a problem that is of poor quality of an audio signal played by the screen sound generator and that is caused due to damage of the screen sound generator.

According to a first aspect, this application provides a device detection method applied to a terminal that includes a first sound generator and a second sound generator. The method includes: playing a first audio signal through the first sound generator and playing a second audio signal through the second sound generator after displaying a call application interface, where the first audio signal is an audio signal played by the terminal through the first sound generator in a first time period, and the second audio signal is an audio signal played by the terminal through the second sound generator in the first time period; obtaining a plurality of frames of first audio signals to obtain a first audio signal sequence; determining, based on the first audio signal sequence, that the first sound generator is damaged; and in a second time period, playing an audio signal through the second sound generator, and skipping playing the first audio signal through the first sound generator, where the second time period is later than the first time period.

In the foregoing embodiment, the first sound generator may be a screen sound generator, and the second sound generator may be an earpiece. In a call process of a user, the terminal may play an audio signal through the screen sound generator, determine, based on the audio signal, whether the screen sound generator is damaged, and if the screen sound generator is damaged, may not play an audio signal through the screen sound generator, and play the audio signal only through the earpiece. In this way, a problem, caused due to damage of the screen sound generator, that noise is generated in a played audio signal or a played audio signal is distorted can be resolved.

With reference to the first aspect, the playing the second audio signal through the second sound generator specifically includes: increasing energy of the second audio signal; and playing the second audio signal with increased energy through the second sound generator.

In the foregoing embodiment, when the terminal does not use the screen sound generator to play an audio signal, volume of an audio signal played by the earpiece may be increased, so that energy of the audio signal played by the earpiece is increased. In this way, even if the screen sound generator is not used, the user can still clearly hear a sound, and a case in which the user hears a lower sound because the screen sound generator does not play an audio signal, and consequently the user cannot clearly hear the sound is avoided.

With reference to the first aspect, after the determining, based on the first audio signal sequence, that the first sound generator is damaged, the method further includes: displaying a first interface, where the first interface includes prompt information, and the prompt information is used to prompt a user that the first sound generator is damaged.

In the foregoing embodiment, for the first interface, refer to an example user interface shown in FIG. 12 or FIG. 13. In the first interface, the prompt information, for example, "the screen sound generator is damaged and switched to the earpiece to generate a sound. Please go to a nearby service center in a timely manner for repair" may be displayed. In this way, after viewing the prompt information, the user can determine that the screen sound generator does not generate a sound because the screen sound generator is damaged, not because there is a problem in a system, and can perform targeted repair.

With reference to the first aspect, the first sound generator is disposed inside a screen of the terminal, the second sound generator is disposed on a side surface of the terminal, the first audio signal played by the first sound generator is transmitted to a human ear through a bone, and the second audio signal played by the second sound generator is transmitted to the human ear through air.

In the foregoing embodiment, the screen sound generator is disposed inside the screen of the terminal, and the earpiece is disposed on the side surface of the terminal, so that when a full screen is implemented for the terminal, a sound can be clearly picked up, and sound leakage can be reduced.

With reference to the first aspect, the obtaining a plurality of frames of first audio signals to obtain a first audio signal sequence specifically includes: adding a pilot signal to each frame of first audio signal to obtain the first audio signal sequence, where the pilot signal is an audio signal whose frequency is greater than a frequency threshold and whose energy is less than a first energy threshold.

In the foregoing embodiment, the first audio signal sequence may be a downlink audio signal sequence described below. The pilot signal added to the first audio signal sequence is used to filter a feedback signal of the first audio signal sequence to obtain a detection signal. The frequency of the pilot signal is usually greater than a frequency of an audio signal corresponding to voice information. Therefore, information about an audio signal whose frequency is less than that of the pilot signal in the feedback signal corresponding to the first audio signal sequence may be filtered out by using the frequency of the pilot signal as a reference, to obtain the detection signal. In this way, a filtering process can be simplified.

With reference to the first aspect, the frequency threshold is greater than a frequency of the first audio signal, and the first energy threshold is close to −30 dB or equal to −30 dB.

In the foregoing embodiment, if the frequency of the pilot signal is greater than the frequency of the first audio signal, the detection signal can be easily obtained based on a filtered feedback signal.

With reference to the first aspect, the first audio signal sequence includes H frames of first audio signals obtained after the pilot signal is added, including a third audio signal, the third audio signal is a frame of first audio signal obtained after the pilot signal is added, and the determining, based on the first audio signal sequence, that the first sound generator is damaged specifically includes: obtaining a detection signal sequence after playing the first audio signal sequence through the first sound generator, where the detection signal sequence includes K frames of detection signals, including a first detection signal, the first detection signal is a feedback signal corresponding to a silent audio signal in the third audio signal, the silent audio signal in the third audio signal is an audio signal whose energy is less than or equal to a second energy threshold and whose frequency is equal to or greater than the frequency threshold, and the second energy threshold is greater than or equal to the first energy threshold; determining admittance values corresponding to all the frames of detection signals in the detection signal sequence, where the admittance values corresponding to all the frames of detection signals include an admittance value corresponding to the first detection signal, the admittance value corresponding to the first detection signal is used to indicate a first admittance value of the first sound generator existing when the first sound generator plays the silent audio signal in the third audio signal, and the first admittance value is used to indicate a capability of the first sound generator to allow the silent audio signal in the third audio signal to pass; determining an average admittance value corresponding to the detection signal sequence, where the average admittance value corresponding to the detection signal sequence is an average value of the admittance values corresponding to the K frames of detection signals; and when determining that the determined average admittance value corresponding to the detection signal sequence falls outside the normal admittance value range, determining that the screen sound generator is damaged, where the normal admittance value range is a range of an admittance value of the first sound generator existing when the first sound generator plays the silent audio signal and the first sound generator is normal.

In the foregoing embodiment, the terminal may obtain the detection signal sequence from a feedback signal sequence corresponding to a target audio signal sequence played by the screen sound generator, then determine whether the average admittance value of the detection signal sequence falls within the normal admittance value range, and if the average admittance value falls within the normal admittance value range, may determine that the screen sound generator is normal, or if the average admittance value falls outside the normal admittance value range, may determine that the screen sound generator is damaged.

With reference to the first aspect, the obtaining a detection signal sequence after playing the first audio signal sequence through the first sound generator specifically includes: obtaining a first feedback signal sequence corresponding to the first audio signal after playing the first audio signal sequence through the first sound generator, where the first feedback signal sequence includes H frames of feedback signals, including a first feedback signal, the first feedback signal is a feedback signal corresponding to the third audio signal, the first feedback signal includes corresponding current information and corresponding voltage information existing when the first sound generator plays the third audio signal, the first feedback signal carries information about the third audio signal, the third audio signal further includes a non-silent audio signal, the non-silent audio signal is an audio signal whose energy is greater than or equal to a third energy threshold and whose frequency is less than the frequency threshold in the third audio signal, and the third energy threshold is greater than or equal to the second energy threshold; filtering the first feedback signal sequence to obtain a prediction signal sequence, where the prediction signal sequence includes S frames of prediction signals, S is less than or equal to H, the prediction signal sequence includes a first prediction signal, and the first prediction signal is a first feedback signal obtained after the first feedback signal is filtered to remove information about a non-silent audio signal in the first feedback signal; determining an admittance value corresponding to each frame of prediction signal in the prediction signal sequence; and determining all prediction signals whose corresponding admittance values are less than a silent frame admittance value in the prediction signal sequence as the detection signal sequence, where the silent frame admittance value is a maximum admittance value of the first sound generator existing when the first sound generator plays the silent audio signal.

In the foregoing embodiment, the detection signal sequence carries information about the silent audio signal, and therefore it is more accurate to use the average admittance value corresponding to the detection signal sequence to represent the admittance value existing when the screen sound generator plays the silent audio signal. When the average admittance value falls outside the normal admittance value range, it may be determined that the screen sound generator is damaged. This process can be free of interference from energy of a voice signal, and therefore accuracy of a calculation result is improved.

With reference to the first aspect, the filtering the first feedback signal sequence to obtain a prediction signal sequence, where the prediction signal sequence includes S frames of prediction signals specifically includes: filtering some feedback signals in the first feedback signal sequence to obtain the prediction signal sequence, where the some feedback signals are S frames of feedback signals collected at a later time in the first feedback signal sequence, the prediction signal sequence includes S frames of filtered feedback signals, and S is less than H; or filtering all feedback signals in the first feedback signal sequence to obtain the prediction signal sequence, where the prediction signal sequence includes S frames of filtered feedback signals, and S is equal to H.

In the foregoing embodiment, a feedback signal collected at an earlier time may carry information about noise caused due to circuit instability. The information about this part of noise has a frequency greater than that of the pilot signal, and cannot be filtered out when feedback signal is filtered, and a filtered downlink prediction signal still includes the information about this part of noise. Consequently, an admittance value corresponding to the filtered downlink prediction signal is relatively large, and is of no reference value, and therefore there is no need to calculate the admittance value in a subsequent step. This initial stage further affects stability of the pilot signal. Therefore, the feedback signal at an earlier time is not used in a calculation process, to improve accuracy of a calculation result.

With reference to the first aspect, the normal admittance value range is predetermined and then set in the terminal, and a process of determining the normal admittance value range includes: separately playing the second audio signal sequence through M samples of the first sound generator under a normal condition; respectively obtaining corresponding second feedback signal sequences existing when the M samples play the second audio signal sequence, to obtain the second feedback signal sequences corresponding to the M samples; respectively determining silent prediction signal sequences corresponding to the M samples based on the second feedback signal sequences corresponding to the M samples, where the M samples include a first sample, a silent prediction signal sequence corresponding to the first sample includes a plurality of frames of silent prediction signals, including a first silent prediction signal, the first silent prediction signal is a filtered feedback signal that meets a first condition and that is obtained after a second feedback signal sequence corresponding to the first sample is filtered, and the first condition is that an admittance value corresponding to the filtered feedback signal is less than or equal to an admittance threshold; respectively determining reference admittance values corresponding to the M samples based on the silent prediction signal sequences corresponding to the M samples, where a reference admittance value of the first sample is an average value of admittance values corresponding to all the silent prediction signals in the silent prediction signal sequence corresponding to the first sample; and determining the normal admittance value range based on the reference admittance values corresponding to the M samples.

In the foregoing embodiment, the terminal determines the normal admittance value range by performing testing by using a large quantity of samples of the screen sound generator. This is universally applicable.

With reference to the first aspect, the determining the normal admittance value range based on the reference admittance values corresponding to the M samples specifically includes: determining a largest value in the reference admittance values corresponding to the M samples and a smallest value in the reference admittance values corresponding to the M samples; and determining that the normal admittance value range is from the smallest value in the reference admittance values to the largest value in the reference admittance values.

With reference to the first aspect, the silent frame admittance value is predetermined and then set in the terminal, and a process of determining the silent frame admittance value includes: determining average reference admittance values of M samples of the first sound generator under different conditions, where the different conditions include the normal condition and at least one abnormal condition, an average reference admittance value of the M samples under the normal condition is an average value of reference admittance values corresponding to the M samples under the normal condition, and an average reference admittance value of the M samples under the abnormal condition is an average value of reference admittance values corresponding to the M samples under the abnormal condition; and determining the silent frame admittance value based on the average reference admittance values of the M samples of the first sound generator under the different conditions.

In the foregoing embodiment, the terminal determines the silent frame admittance value by performing testing by using a large quantity of samples of the screen sound generator under different conditions. This is universally applicable.

With reference to the first aspect, the determining the silent frame admittance value based on the average reference admittance values of the M samples of the first sound generator under the different conditions specifically includes: determining that a largest value in the average reference admittance values of the M samples of the first sound generator under the different conditions is the silent frame admittance value.

According to a second aspect, this application provides a terminal. The terminal includes one or more processors and a memory. The memory is coupled to the one or more processors. The memory is configured to store computer program code. The computer program code includes computer instructions. The one or more processors invoke the computer instructions to enable the terminal to perform the following operations: playing a first audio signal through a first sound generator and playing a second audio signal through a second sound generator after displaying a call application interface, where the first audio signal is an audio signal played by the terminal through the first sound generator in a first time period, and the second audio signal is an audio signal played by the terminal through the second sound generator in the first time period; obtaining a plurality of frames of first audio signals to obtain a first audio signal sequence; determining, based on the first audio signal sequence, that the first sound generator is damaged; and in a second time period, playing an audio signal through the second sound generator, and skipping playing the first audio signal through the first sound generator, where the second time period is later than the first time period.

In the foregoing embodiment, the first sound generator may be a screen sound generator, and the second sound generator may be an earpiece. In a call process of a user, the terminal may play an audio signal through the screen sound generator, determine, based on the audio signal, whether the screen sound generator is damaged, and if the screen sound generator is damaged, may not play an audio signal through the screen sound generator, and play the audio signal only through the earpiece. In this way, a problem, caused due to damage of the screen sound generator, that noise is generated in a played audio signal or a played audio signal is distorted can be resolved.

With reference to the second aspect, the one or more processors are specifically configured to invoke the computer instructions to enable the terminal to perform the following operations: increasing energy of the second audio signal; and playing the second audio signal with increased energy through the second sound generator.

In the foregoing embodiment, when the terminal does not use the screen sound generator to play an audio signal, volume of an audio signal played by the earpiece may be increased, so that energy of the audio signal played by the earpiece is increased. In this way, even if the screen sound generator is not used, the user can still clearly hear a sound, and a case in which the user hears a lower sound because the screen sound generator does not play an audio signal, and consequently the user cannot clearly hear the sound is avoided.

With reference to the second aspect, the one or more processors are further configured to invoke the computer instructions to enable the terminal to perform the following operation: displaying a first interface, where the first interface includes prompt information, and the prompt information is used to prompt a user that the first sound generator is damaged.

In the foregoing embodiment, for the first interface, refer to an example user interface shown in FIG. 12 or FIG. 13. In the first interface, the prompt information, for example, "the screen sound generator is damaged and switched to the earpiece to generate a sound. Please go to a nearby service center in a timely manner for repair" may be displayed. In this way, after viewing the prompt information, the user can determine that the screen sound generator does not generate a sound because the screen sound generator is damaged, not because there is a problem in a system, and can perform targeted repair.

With reference to the second aspect, the one or more processors are specifically configured to invoke the computer instructions to enable the terminal to perform the following operation: adding a pilot signal to each frame of first audio signal to obtain the first audio signal sequence, where the pilot signal is an audio signal whose frequency is greater than a frequency threshold and whose energy is less than a first energy threshold.

In the foregoing embodiment, the first audio signal sequence may be a downlink audio signal sequence described below. The pilot signal added to the first audio signal sequence is used to filter a feedback signal of the first audio signal sequence to obtain a detection signal. The frequency of the pilot signal is usually greater than a frequency of an audio signal corresponding to voice information. Therefore, information about an audio signal whose frequency is less than that of the pilot signal in the feedback signal corresponding to the first audio signal sequence may be filtered out by using the frequency of the pilot signal as a reference, to obtain the detection signal. In this way, a filtering process can be simplified.

With reference to the second aspect, the one or more processors are specifically configured to invoke the computer instructions to enable the terminal to perform the following operations: obtaining a detection signal sequence after playing the first audio signal sequence through the first sound generator, where the detection signal sequence includes K frames of detection signals, including a first detection signal, the first detection signal is a feedback signal corresponding to a silent audio signal in the third audio signal, the silent audio signal in the third audio signal is an audio signal whose energy is less than or equal to a second energy threshold and whose frequency is equal to or greater than the frequency threshold, and the second energy threshold is greater than or equal to the first energy threshold; determining admittance values corresponding to all the frames of detection signals in the detection signal sequence, where the admittance values corresponding to all the frames of detection signals include an admittance value corresponding to the first detection signal, the admittance value corresponding to the first detection signal is used to indicate a first admittance value of the first sound generator existing when the first sound generator plays the silent audio signal in the third audio signal, and the first admittance value is used to indicate a capability of the first sound generator to allow the silent audio signal in the third audio signal to pass; determining an average admittance value corresponding to the detection signal sequence, where the average admittance value corresponding to the detection signal sequence is an average value of the admittance values corresponding to the K frames of detection signals; and when determining that the determined average admittance value corresponding to the detection signal sequence falls outside the normal admittance value range, determining that the screen sound generator is damaged, where the normal admittance value range is a range of an admittance value of the first sound generator existing when the first sound generator plays the silent audio signal and the first sound generator is normal.

In the foregoing embodiment, the terminal may obtain the detection signal sequence from a feedback signal sequence corresponding to a target audio signal sequence played by the screen sound generator, then determine whether the average admittance value of the detection signal sequence falls within the normal admittance value range, and if the average admittance value falls within the normal admittance value, may determine that the screen sound generator is normal, or if the average admittance value falls outside the normal admittance value range, may determine that the screen sound generator is damaged.

With reference to the second aspect, the one or more processors are specifically configured to invoke the computer instructions to enable the terminal to perform the following operations: obtaining a first feedback signal sequence corresponding to the first audio signal after playing the first audio signal sequence through the first sound generator, where the first feedback signal sequence includes H frames of feedback signals, including a first feedback signal, the first feedback signal is a feedback signal corresponding to the third audio signal, the first feedback signal includes corresponding current information and corresponding voltage information existing when the first sound generator plays the third audio signal, the first feedback signal carries information about the third audio signal, the third audio signal further includes a non-silent audio signal, the non-silent audio signal is an audio signal whose energy is greater than or equal to a third energy threshold and whose frequency is less than the frequency threshold in the third audio signal, and the third energy threshold is greater than or equal to the second energy threshold; filtering the first feedback signal sequence to obtain a prediction signal sequence, where the prediction signal sequence includes S frames of prediction signals, S is less than or equal to H, the prediction signal sequence includes a first prediction signal, and the first prediction signal is a first feedback signal obtained after the first feedback signal is filtered to remove information about a non-silent audio signal in the first feedback signal; determining an admittance value corresponding to each frame of prediction signal in the prediction signal sequence; and determining all prediction signals whose corresponding admittance values are less than a silent frame admittance value in the prediction signal sequence as the detection signal sequence, where the silent frame admittance value is a maximum admittance value of the first sound generator existing when the first sound generator plays the silent audio signal.

In the foregoing embodiment, the detection signal sequence carries information about the silent audio signal, and therefore it is more accurate to use the average admittance value corresponding to the detection signal sequence to represent the admittance value existing when the screen sound generator plays the silent audio signal. When the average admittance value falls outside the normal admittance value range, it may be determined that the screen sound generator is damaged. This process can be free of interference from energy of a voice signal, and therefore accuracy of a calculation result is improved.

With reference to the second aspect, the one or more processors are specifically configured to invoke the computer instructions to enable the terminal to perform the following operations: filtering some feedback signals in the first feedback signal sequence to obtain the prediction signal sequence, where the some feedback signals are S frames of feedback signals collected at a later time in the first feedback signal sequence, the prediction signal sequence includes S frames of filtered feedback signals, and S is less than H; or filtering all feedback signals in the first feedback signal sequence to obtain the prediction signal sequence, where the prediction signal sequence includes S frames of filtered feedback signals, and S is equal to H.

In the foregoing embodiment, a feedback signal collected at an earlier time may carry information about noise caused due to circuit instability. The information about this part of noise has a frequency greater than that of the pilot signal, and cannot be filtered out when feedback signal is filtered, and a filtered downlink prediction signal still includes the information about this part of noise. Consequently, an admittance value corresponding to the filtered downlink prediction signal is relatively large, and is of no reference value, and therefore there is no need to calculate the admittance value in a subsequent step. This initial stage further affects stability of the pilot signal. Therefore, the feedback signal at an earlier time is not used in a calculation process, to improve accuracy of a calculation result.

With reference to the second aspect, the one or more processors are specifically configured to invoke the computer instructions to enable the terminal to perform the following operations: separately playing the second audio signal sequence through M samples of the first sound generator under a normal condition; respectively obtaining corresponding second feedback signal sequences existing when the M samples play the second audio signal sequence, to obtain the second feedback signal sequences corresponding to the M samples; respectively determining silent prediction signal sequences corresponding to the M samples based on the second feedback signal sequences corresponding to the M samples, where the M samples include a first sample, a silent prediction signal sequence corresponding to the first sample includes a plurality of frames of silent prediction signals, including a first silent prediction signal, the first silent prediction signal is a filtered feedback signal that meets a first condition and that is obtained after a second feedback signal sequence corresponding to the first sample is filtered, and the first condition is that an admittance value corresponding to the filtered feedback signal is less than or equal to an admittance threshold; respectively determining reference admittance values corresponding to the M samples based on the silent prediction signal sequences corresponding to the M samples, where a reference admittance value of the first sample is an average value of admittance values corresponding to all the silent prediction signals in the silent prediction signal sequence corresponding to the first sample; and determining the normal admittance value range based on the reference admittance values corresponding to the M samples.

In the foregoing embodiment, the terminal determines the normal admittance value range by performing testing by using a large quantity of samples of the screen sound generator. This is universally applicable.

With reference to the second aspect, the one or more processors are specifically configured to invoke the computer instructions to enable the terminal to perform the following operations: determining a largest value in the reference admittance values corresponding to the M samples and a smallest value in the reference admittance values corresponding to the M samples; and determining that the normal admittance value range is from the smallest value in the reference admittance values to the largest value in the reference admittance values.

With reference to the second aspect, the one or more processors are specifically configured to invoke the computer instructions to enable the terminal to perform the following operations: determining average reference admittance values of M samples of the first sound generator under different conditions, where the different conditions include the normal condition and at least one abnormal condition, an average reference admittance value of the M samples under the normal condition is an average value of reference admittance values corresponding to the M samples under the normal condition, and an average reference admittance value of the M samples under the abnormal condition is an average value of reference admittance values corresponding to the M samples under the abnormal condition; and determining the silent frame admittance value based on the average reference admittance values of the M samples of the first sound generator under the different conditions.

In the foregoing embodiment, the terminal determines the silent frame admittance value by performing testing by using a large quantity of samples of the screen sound generator under different conditions. This is universally applicable.

With reference to the second aspect, the one or more processors are specifically configured to invoke the computer instructions to enable the terminal to perform the following operation: determining that a largest value in the average reference admittance values of the M samples of the first sound generator under the different conditions is the silent frame admittance value.

According to a third aspect, an embodiment of this application provides a terminal. The terminal includes one or more processors and a memory. The memory is coupled to the one or more processors. The memory is configured to store computer program code. The computer program code includes computer instructions. The one or more processors invoke the computer instructions to enable the terminal to perform the method according to any one of the first aspect or the implementations of the first aspect.

In the foregoing embodiment, a first sound generator may be a screen sound generator, and a second sound generator may be an earpiece. In a call process of a user, the terminal may play an audio signal through the screen sound generator, determine, based on the audio signal, whether the screen sound generator is damaged, and if the screen sound generator is damaged, may not play an audio signal through the screen sound generator, and play the audio signal only through the earpiece. In this way, a problem, caused due to damage of the screen sound generator, that noise is generated in a played audio signal or a played audio signal is distorted can be resolved.

According to a fourth aspect, an embodiment of this application provides a chip system. The chip system is applied to a terminal. The chip system includes one or more processors, and the processor is configured to invoke computer instructions to enable the terminal to perform the method according to any one of the first aspect or the implementations of the first aspect.

In the foregoing embodiment, a first sound generator may be a screen sound generator, and a second sound generator may be an earpiece. In a call process of a user, the terminal may play an audio signal through the screen sound generator, determine, based on the audio signal, whether the screen sound generator is damaged, and if the screen sound generator is damaged, may not play an audio signal through the screen sound generator, and play the audio signal only through the earpiece. In this way, a problem, caused due to damage of the screen sound generator, that noise is generated in a played audio signal or a played audio signal is distorted can be resolved.

According to a fifth aspect, an embodiment of this application provides a computer program product including instructions. When the computer program product is run on a terminal, the terminal is enabled to perform the method according to any one of the first aspect or the implementations of the first aspect.

In the foregoing embodiment, a first sound generator may be a screen sound generator, and a second sound generator may be an earpiece. In a call process of a user, the terminal may play an audio signal through the screen sound generator, determine, based on the audio signal, whether the screen sound generator is damaged, and if the screen sound generator is damaged, may not play an audio signal through the screen sound generator, and play the audio signal only through the earpiece. In this way, a problem, caused due to damage of the screen sound generator, that noise is generated in a played audio signal or a played audio signal is distorted can be resolved.

According to a sixth aspect, an embodiment of this application provides a computer-readable storage medium, including instructions. When the instructions are run on a terminal, the terminal is enabled to perform the method according to any one of the first aspect or the implementations of the first aspect.

In the foregoing embodiment, a first sound generator may be a screen sound generator, and a second sound generator may be an earpiece. In a call process of a user, the terminal may play an audio signal through the screen sound generator, determine, based on the audio signal, whether the screen sound generator is damaged, and if the screen sound generator is damaged, may not play an audio signal through the screen sound generator, and play the audio signal only through the earpiece. In this way, a problem, caused due to damage of the screen sound generator, that noise is generated in a played audio signal or a played audio signal is distorted can be resolved.

DESCRIPTION OF EMBODIMENTS

Terms used in the following embodiments of this application are merely intended to describe specific embodiments, but not intended to limit this application. As used in this specification and the claims of this application, singular expressions "one", "a", "the", "foregoing", and "this" are intended to include plural expressions, unless otherwise clearly specified in the context. It should be further understood that the term "and/or" used in this application indicates and includes any or all possible combinations of one or more listed items.

The following terms "first" and "second" are merely intended for descriptive purposes, and shall not be understood as an indication or implication of relative importance or an implicit indication of a quantity of indicated technical features. Therefore, features defined by "first" and "second" may explicitly or implicitly include one or more features. In the descriptions of the embodiments of this application, unless otherwise specified, "a plurality of" means two or more.

In a solution, two sound generators, namely, an earpiece and a screen sound generator, are disposed in a terminal. The earpiece is disposed on a side surface of the terminal, and the screen sound generator is disposed inside a screen of the terminal. The terminal may process an audio signal sent by another terminal to the terminal, to generate two audio signals, and then play one audio signal through the earpiece, and play the other audio signal through the screen sound generator. In different environments, the terminal may control energy of the two audio signals, so that in the different environments, the terminal can enable a user to clearly pick up a sound and sound leakage can be reduced. The audio signal played by the screen sound generator may be transmitted to a human ear through a bone, and the audio signal played by the earpiece may be transmitted to the human ear through air.

However, the screen sound generator is damaged due to some adverse factors. For example, the screen sound generator is used for a long time or is damaged by external force. When the screen sound generator is damaged, the screen sound generator generates noise when playing an audio signal, and loss and distortion are caused to the played audio signal. In this way, an audio signal heard by the user carries noise or is distorted, and quality of the audio signal played by the terminal is degraded. If this process occurs during a call, call quality is affected.

Figure 1A:
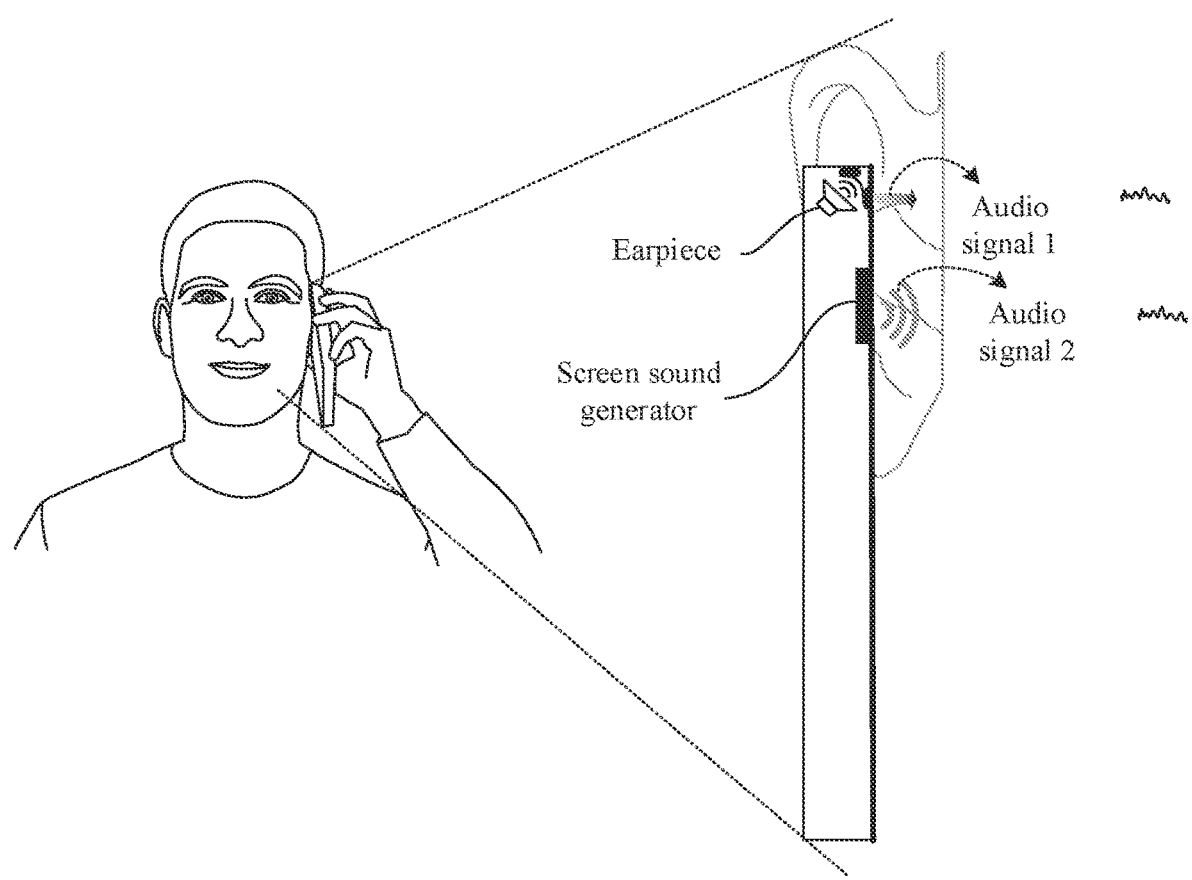
FIG. 1A and FIG. 1B are schematic diagrams in which two sound generators are disposed in a terminal in a solution.
Figure 1B:
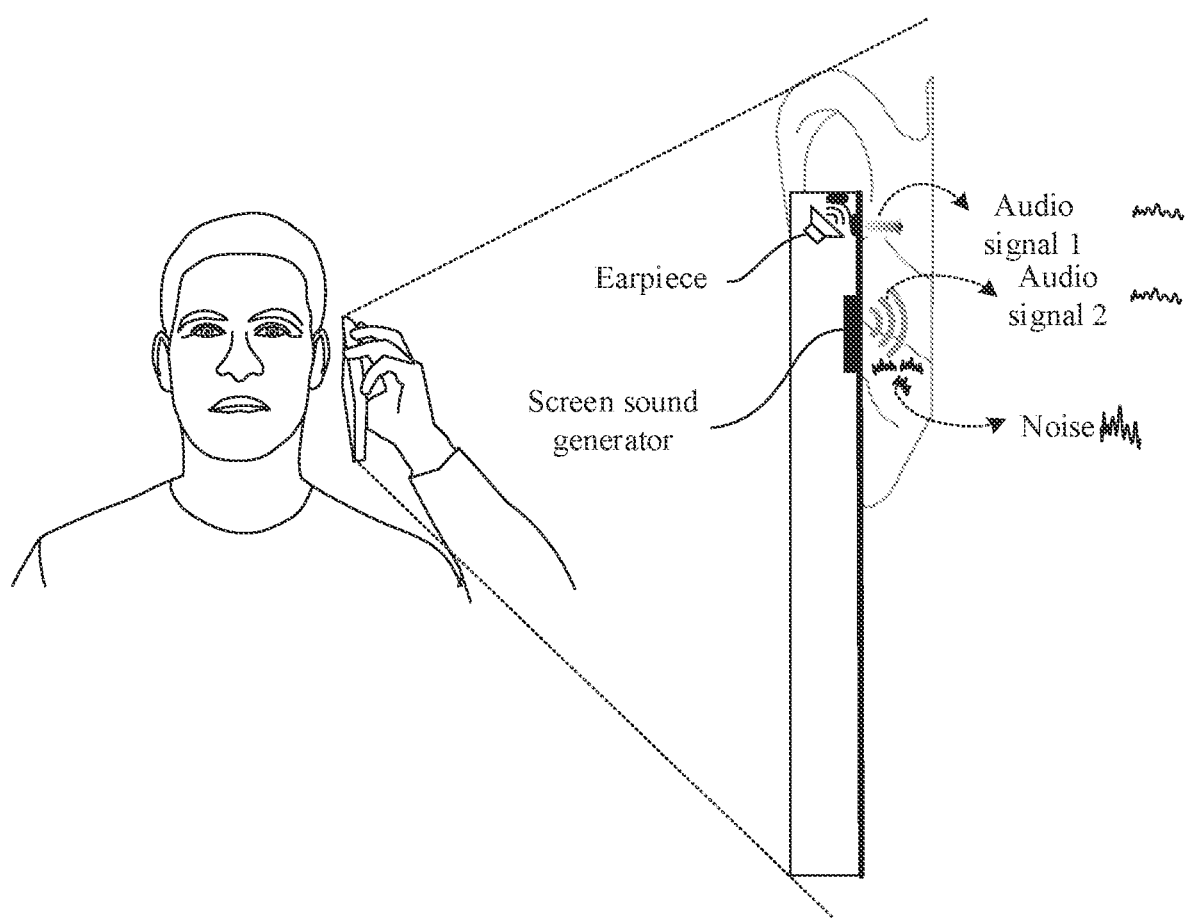

FIG. TA and FIG. 1B are schematic diagrams in which two sound generators are disposed in a terminal in a solution.

FIG. TA is a schematic diagram existing when the two sound generators normally generate sounds. As shown in FIG. 1A, a user holds the terminal to make a call, and the terminal is in close contact with a human ear. In this case, the terminal may play an audio signal through an earpiece, where the audio signal includes an audio signal 1, and may play another audio signal through a screen sound generator, where the another audio signal includes an audio signal 2. The terminal may reduce energy of the audio signal 1, so that the audio signal sounds lower (lower decibel), to reduce sound leakage, and may play the audio signal 2 for compensation, so that the user clearly hears a sound.

FIG. 1B is a schematic diagram existing when the screen sound generator is damaged. As shown in FIG. 1B, the user makes a call by using the terminal. In this case, the terminal may play an audio signal through the earpiece, where the audio signal includes an audio signal 1, and may play another audio signal through the screen sound generator, where the another audio signal includes an audio signal 2. However, because the screen sound generator is damaged, the screen sound generator generates noise, and consequently the audio signal played by the screen sound generator carries the noise. After hearing the noise, the user no longer puts the terminal in close contact with the human ear, to reduce impact caused by the noise. In this way, the noise and the terminal are excessively far away from the human ear, and therefore the user cannot clearly hear a sound.

To resolve the problem in the foregoing solution, a device detection method is provided in the embodiments of this application. The method may be used to detect whether a screen sound generator is damaged. When determining that the screen sound generator is damaged, a terminal may use some manners to eliminate adverse impact (for example, the foregoing impact that noise is carried when an audio signal is played) caused due to damage of the screen sound generator.

When the terminal determines that the screen sound generator is damaged, a to-be-used manner may include but is not limited to the following manner.

Manner 1: The terminal no longer plays an audio signal through the screen sound generator, plays the audio signal only through an earpiece, and increases energy of the audio signal played by the earpiece, so that a user can clearly hear a sound.

Manner 2: The terminal may display prompt information to notify a user that the screen sound generator is damaged, and may advise the user to repair the screen sound generator at a nearby service center.

It should be understood that the terminal may combine the manner 1 and the manner 2 to eliminate the adverse impact caused due to damage of the screen sound generator, or may use another manner. This is not limited in the embodiments of this application.

Principles and Related Concepts Used in Detecting a Screen Sound Generator in the Embodiments of this Application are Described Below.

It should be understood that when the screen sound generator is normal and when the screen sound generator converts a silent audio signal into an electrical signal (analog electrical signal) for play, an admittance value of the screen sound generator may be fixed within a range. The range may be referred to as a normal admittance value range below. The admittance value may reflect a capability of the screen sound generator to allow the silent audio signal to pass. A larger admittance value indicates that it is easier for the screen sound generator to allow the silent audio signal to pass. A smaller admittance value indicates that it is more difficult for the screen sound generator to allow the silent audio signal to pass.

The silent audio signal is an audio signal whose energy is less than or equal to an energy threshold and whose frequency is greater than a frequency threshold, and may not carry voice information. The admittance value existing when the silent audio signal passes through the screen sound generator may be calculated by using a feedback signal corresponding to the silent audio signal, and the calculated admittance value corresponds to the feedback signal (for a calculation process, refer to description of the following step S107). The feedback signal corresponding to the silent audio signal may also be referred to as a detection signal. An admittance value calculated by using the detection signal may be referred to as an admittance value corresponding to the detection signal below. The admittance value corresponding to the detection signal may represent the admittance value existing when the silent audio signal passes through the screen sound generator, and may also be referred to as an admittance value corresponding to the silent audio signal.

It should be understood that in some possible cases, a frequency of a signal (including an audio signal, a feedback signal, or the like) may be understood as a maximum frequency of a frequency point existing after conversion into frequency domain. The voice information includes a sound of a user and a sound in an environment, and further includes information about another sound.

Normally, the screen sound generator usually plays an audio signal (which may also be referred to as a target audio signal) that carries voice information, and the silent audio signal may be included in the audio signal that carries the voice information. Therefore, the feedback signal corresponding to the silent audio signal may be obtained from the target audio signal played by the screen sound generator.

Based on the foregoing description, in a possible implementation, a terminal may obtain a detection signal from a feedback signal corresponding to the target audio signal played by the screen sound generator, then determine whether an admittance value corresponding to the detection signal falls within the normal admittance value range, and if the admittance value falls within the normal admittance value, may determine that the screen sound generator is normal, or if the admittance value falls outside the normal admittance value range, may determine that the screen sound generator is damaged. The detection signal is a filtered feedback signal obtained after the feedback signal is filtered, and the admittance value corresponding to the detection signal is less than a silent frame admittance value.

The target audio signal in the foregoing implementation is one frame of target audio signal. To more accurately determine whether the screen sound generator is normal, in another possible implementation, a terminal may obtain a detection signal sequence from a feedback signal sequence corresponding to a target audio signal sequence played by the screen sound generator, then determine whether an average admittance value of the detection signal sequence falls within the normal admittance value range, and if the average admittance value falls within the normal admittance value, may determine that the screen sound generator is normal, or if the average admittance value falls outside the normal admittance value range, may determine that the screen sound generator is damaged. The target audio signal sequence includes at least Q frames of target audio signals, where Q is a positive integer greater than or equal to 2. The feedback signal sequence includes feedback signals corresponding to the Q frames of target audio signals. The detection signal sequence includes R frames of detection signals, where R is less than or equal to Q. The detection signal sequence is all filtered feedback signals whose admittance values are less than a silent frame admittance value in a filtered feedback signal sequence obtained after the feedback signal sequence is filtered.

Related concepts such as the target audio signal, the feedback signal, the detection signal, the normal admittance value range, and the silent frame admittance value in the foregoing implementations are described below. For ease of understanding, unless otherwise specified, a signal, including the target audio signal, the feedback signal, the detection signal, a pilot signal, a preprocessed audio signal, or the like, in a description process may represent one or more frames of signals, that is, may represent a signal sequence or one frame of signal. For example, the described target audio signal may represent a target audio signal sequence or one frame of target audio signal.

1. Target Audio Signal

The target audio signal (including one frame of target audio signal and a target audio signal sequence) is an audio signal obtained after a pilot signal is added to a preprocessed audio signal. The pilot signal refers to one or more frames of audio signals with a high frequency and low energy. The high frequency means that the frequency of the pilot signal is greater than a first frequency threshold. The first frequency threshold is usually greater than a frequency of a sound generated by a user, and a value range may be 18 kHz or more. The low energy means that the energy of the pilot signal is less than a first energy threshold (the first energy threshold has a very small value, and may be −30 dB). This indicates that the pilot signal is silent signal or similar to silent signal, and may not carry voice information. The preprocessed audio signal usually carries voice information, and the voice information may indicate a sound. The target audio signal is an audio signal obtained after the pilot signal is added to the preprocessed audio signal.

Figure 2:
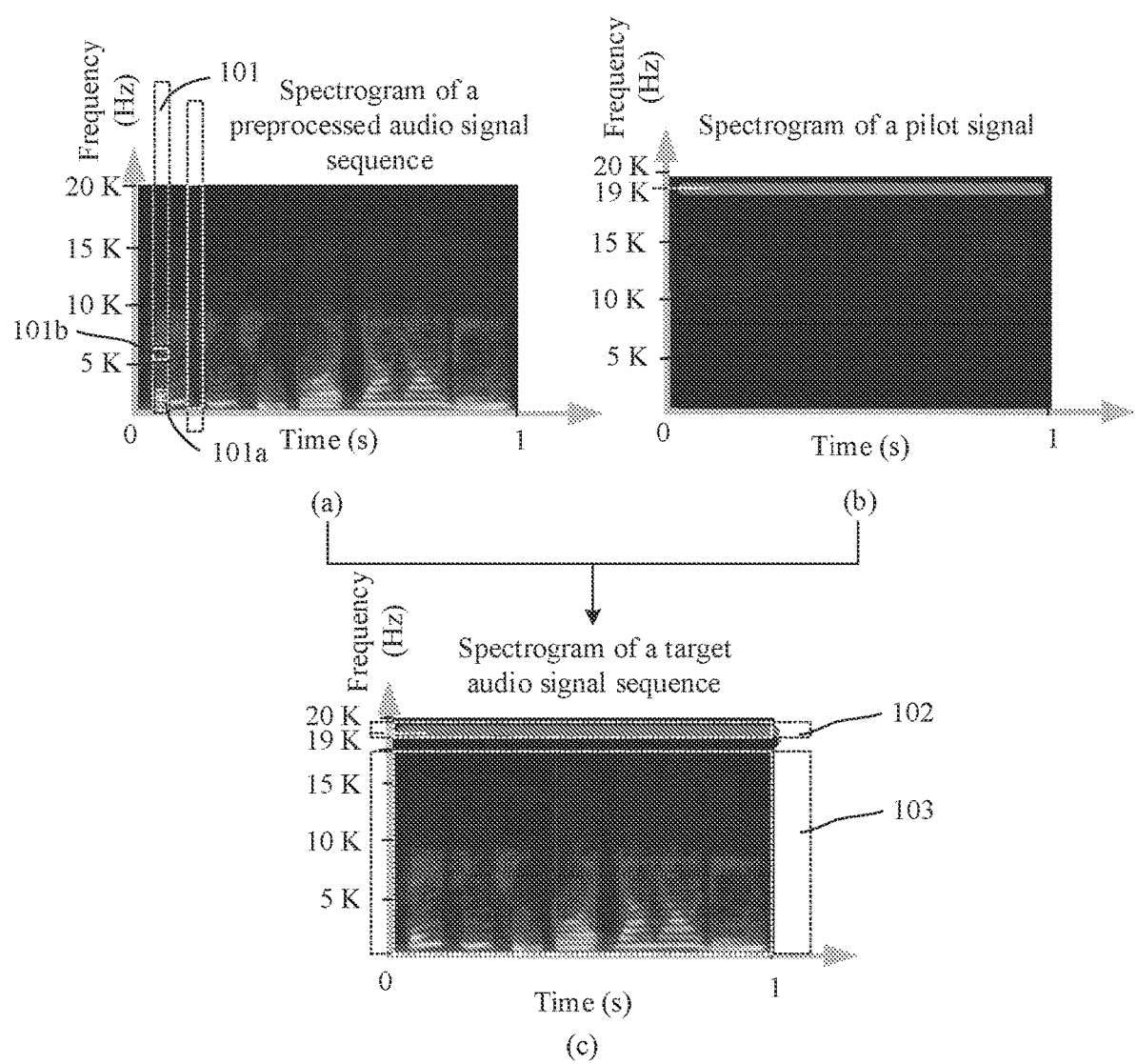
FIG. 2 is a schematic diagram of adding a pilot signal to a preprocessed audio signal to obtain a target audio signal.

FIG. 2 is a schematic diagram of adding a pilot signal to a preprocessed audio signal to obtain a target audio signal.

It should be understood that for ease of observation and understanding, in FIG. 2, a spectrogram is used to represent an audio signal (including the preprocessed audio signal, the pilot signal, and the target audio signal). The spectrogram of the audio signal may represent an audio signal in frequency domain. The audio signal in frequency domain may be obtained by performing Fourier transform on an audio signal in time domain.

The preprocessed audio signal shown in (a) in FIG. 2 is an audio signal existing before the pilot signal is added, and (b) in FIG. 2 shows the pilot signal. The pilot signal shown in (b) in FIG. 2 is added to the preprocessed audio signal shown in (a) in FIG. 2 to obtain the target audio signal shown in (c) in FIG. 2.

The preprocessed audio signal, the pilot signal, and the target audio signal are described below by using the spectrogram of the audio signal shown in FIG. 2 as an example.

As shown in (a) in FIG. 2, a horizontal coordinate and a vertical coordinate of a spectrogram of the preprocessed audio signal respectively represent time and a frequency. The preprocessed audio signal shown in FIG. 2 is an audio signal of 1s. If a time of one frame of preprocessed audio signal is 10 ms, the preprocessed audio signal may include 100 frames of preprocessed audio signals. For example, content in a region 101 may be represented as one frame of preprocessed audio signal. Description is provided below on the basis of one frame of preprocessed audio signal. For another preprocessed audio signal, refer to the related description.

One frame of preprocessed audio signal may include D (an integer power of 2) frequency points. Each frequency point may include time, a frequency, and energy. For the frequency point, the time represents time, in the preprocessed audio signal, of the frame of preprocessed audio signal in which the frequency point is located, the frequency represents a frequency of an audio signal corresponding to the frequency point, and the energy represents energy of the audio signal corresponding to the frequency point. The energy is in a unit of decibel (dB), and represents a decibel value of audio information corresponding to the frequency point. Brightness of a color of each frequency point in the spectrogram may represent a magnitude of energy. Brightness of a color of each frequency point in FIG. 2 may represent a similarity to white. A higher similarity to white indicates higher energy of an audio signal included in the frequency point. A sum of energy of all frequency points included in one frame of audio signal may represent energy of the frame of audio signal. For example, a color of a frequency point included in a region 101a has a higher similarity to white than a color of a frequency point included in a region 101b, which indicates that the frequency point included in the region 101a is brighter than the frequency point included in the region 101b. Therefore, energy of the frequency point included in the region 101a is greater than that of the frequency point included in the region 101b.

Based on the foregoing description, it may be learned, with reference to (b) in FIG. 2, that all frequency points in the pilot signal are darker in color, which indicates that energy of the pilot signal is very low. Therefore, the pilot signal may not carry voice information. A frequency of the pilot signal is 19 kHz, and the pilot signal has a higher frequency than the preprocessed audio signal.

Based on the foregoing description, it may be learned, with reference to (c) in FIG. 2, that the target audio signal may include information about the preprocessed audio signal, for example, voice information included in the preprocessed audio signal, and may further include information about the pilot signal. In general, the preprocessed audio signal carries the voice information, and therefore has higher energy, while the pilot signal has lower energy. For example, a region 102 is an illustration of the energy of the pilot signal, and a region 103 is an illustration of the energy of the preprocessed audio signal. It may be learned, through comparison between the energy of the pilot signal and the energy of the preprocessed audio signal, that the frequency point in the pilot signal is darker in color and lower in energy.

In addition to the method for adding the pilot signal to the preprocessed audio signal to obtain the target audio signal in frequency domain, a terminal may add a pilot signal in time domain to a preprocessed audio signal in time domain to obtain a target audio signal in time domain. The audio signal in time domain may be represented as A sampling points, and one sampling point may include a time and an amplitude. The time represents a time at which the sampling point is obtained, and the amplitude represents a magnitude of a voltage corresponding to an audio signal corresponding to the sampling point, or may represent a magnitude of energy or a decibel value of the audio signal.

2. Feedback Signal

The feedback signal is a current signal and a voltage signal (generated by a power amplifier) generated when a target audio signal drives, in a process in which a screen sound generator plays the target audio signal, the power amplifier connected to the screen sound generator. The feedback signal includes information about the target audio signal (information about a preprocessed audio signal and information about a pilot signal). The current signal may include current information corresponding to the target audio signal existing when the screen sound generator plays the target audio signal. The voltage signal may include voltage information corresponding to the target audio signal existing when the screen sound generator plays the target audio signal. Therefore, an admittance value corresponding to the feedback signal can reflect a corresponding admittance value existing when the screen sound generator plays the target audio signal. The feedback signal may be referred to as a feedback signal corresponding to the target audio signal, and the feedback signal carries the information about the target audio signal.

The corresponding admittance value existing when the screen sound generator plays the target audio signal may reflect a capability of the screen sound generator to allow the electrical signal to pass. A higher capability of the screen sound generator to allow the electrical signal to pass indicates a larger admittance value corresponding to the electrical signal. A lower capability of the screen sound generator to allow the electrical signal to pass indicates a smaller admittance value corresponding to the electrical signal. When the screen sound generator is damaged, the capability of the screen sound generator to allow the electrical signal to pass may be enhanced or weakened compared with a case in which the screen sound generator is normal. For example, when the screen sound generator is damaged due to an open circuit, the capability to allow the electrical signal to pass is weakened, and accordingly the admittance value becomes smaller (compared with the case in which the screen sound generator is normal); or when the screen sound generator is damaged due to a short circuit, the capability to allow the electrical signal to pass is enhanced, and accordingly the admittance value becomes larger (compared with the case in which the screen sound generator is normal).

3. Detection Signal

The detection signal is a filtered feedback signal that is obtained after a feedback signal is filtered and whose admittance value is less than a silent frame admittance value. For related description of the silent frame admittance value, refer to the following related description of the silent frame admittance value. Details are not described herein.

Filtering is performed to filter out a feedback signal corresponding to a non-silent audio signal included in the feedback signal and retain a feedback signal corresponding to a silent audio signal (in some cases, the feedback signal corresponding to the silent audio signal may be considered as a detection signal). It may be learned that an admittance value corresponding to the detection signal can reflect an admittance value existing when a screen sound generator plays the silent audio signal. In some possible cases, the silent audio signal may be a pilot signal in a target audio signal, and the non-silent audio signal may be an audio signal other than the pilot signal in the target audio signal. The silent audio signal is an audio signal whose energy is less than or equal to a second energy threshold and whose frequency is greater than or equal to a first frequency threshold (the first frequency threshold is a frequency threshold of the pilot signal described above) in the target audio signal, and the second energy threshold has a very small value (which may be greater than or equal to the first energy threshold). Therefore, the silent audio signal has very low energy, and may not carry voice information. The non-silent audio signal is an audio signal whose energy is greater than or equal to a third energy threshold and whose frequency is less than the first frequency threshold (the first frequency threshold is a frequency threshold of the pilot signal described above) in the target audio signal, and the third energy threshold may be greater than or equal to the second energy threshold. This indicates that the non-silent target audio signal carries more voice information (compared with the silent audio signal) and has higher energy (compared with the silent audio signal). The non-silent audio signal has higher energy, and therefore when the screen sound generator plays the non-silent audio signal, the feedback signal corresponding to the non-silent audio signal has higher energy, and an admittance value (which is referred to as an admittance value 1 below) corresponding to the feedback signal corresponding to the non-silent target audio signal is interfered with by the energy of the non-silent audio signal (namely, energy carried in the voice information). Consequently, impact of the screen sound generator on the admittance value cannot be truly reflected (because it cannot be determined whether an excessively large admittance value 1 that falls outside the normal admittance value range is caused due to damage of the screen sound generator or caused due to the energy of the target audio signal).

Figure 3:
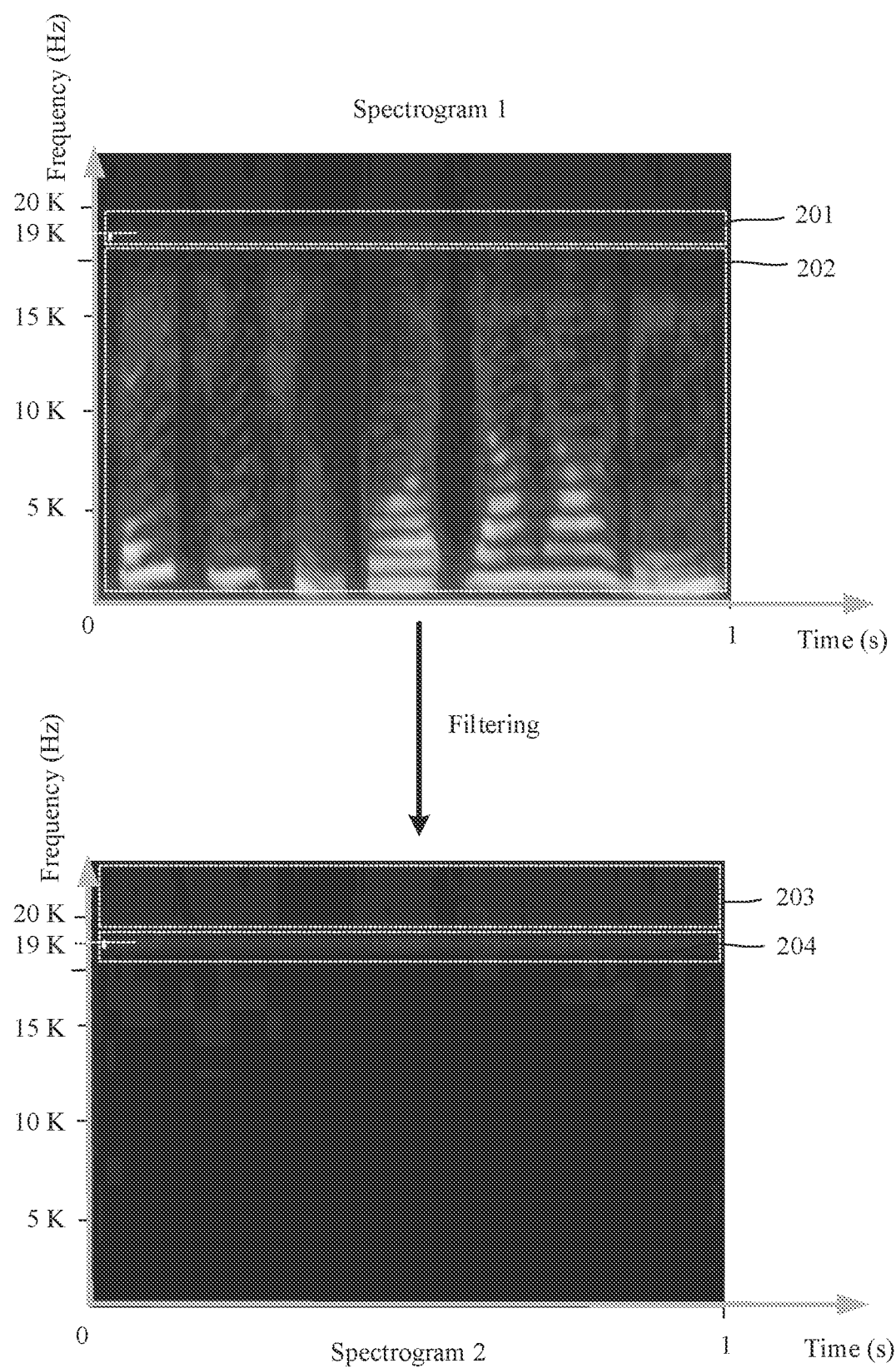
FIG. 3 is a schematic diagram of filtering a feedback signal.

FIG. 3 is a schematic diagram of filtering a feedback signal.

As shown in FIG. 3, a spectrogram 1 may represent the feedback signal, and a spectrogram 2 may represent a filtered feedback signal. The feedback signal (existing before filtering) carries information about a target signal, including information about a pilot signal and information about a preprocessed audio signal. For example, the information carried in the feedback signal existing before filtering includes information about the pilot signal in a region 201 and information about the preprocessed audio signal carried in a region 202. After the feedback signal is filtered, the filtered feedback signal may be obtained. In a filtering manner, a frequency of the pilot signal is used as a reference, and an audio signal whose frequency is less than that of the pilot signal in the feedback signal is filtered out. The audio signal whose frequency is less than that of the pilot signal usually carries most of voice information. Therefore, the filtered feedback signal may be obtained after filtering. The pilot signal is retained in the filtered feedback signal. However, when there is voice information whose frequency is greater than that of the pilot signal in the preprocessed audio signal, it cannot be ensured, through filtering, that the filtered feedback signal does not carry voice information, that is, the filtered feedback signal still carries some voice information in addition to the pilot signal. For example, a region 204 in the spectrogram 2 is the pilot signal included in the filtered feedback signal, and a region 203 is voice information still present in the filtered feedback signal after filtering. When energy of the voice information in the region 203 is excessively high, it is not suitable to use the filtered feedback signal as a detection signal. This is because the energy of this part of voice information affects the admittance value, and further affects determining of whether the screen sound generator is normal. Therefore, a terminal may determine a filtered feedback signal with lower energy as a detection signal. An indicator used to measure whether energy of a filtered feedback signal is relatively low may be the silent frame admittance value. A smaller silent frame admittance value indicates lower energy of voice information carried in the filtered feedback signal (higher energy indicates a larger admittance value).

Based on the foregoing description, it should be understood that feedback signals included in the region 203 and the region 204 in the spectrogram 2 may be referred to as filtered feedback signals (the filtered feedback signal is referred to as a feedback signal 1 below). A frequency of the filtered feedback signal is greater than the first frequency threshold (the first frequency threshold is a frequency threshold of the pilot signal described above. When energy corresponding to the feedback signal 1 is equal to the first energy threshold, information carried in the feedback signal is the information about the pilot signal, and the feedback signal may be used as a detection signal. When energy corresponding to the feedback signal 1 is greater than the first energy threshold but less than or equal to the second energy threshold, the feedback signal 1 may include some other voice information in addition to the information about the pilot signal, but energy of this part of voice information is very low. Therefore, the feedback signal 1 may be considered as the feedback signal corresponding to the silent audio signal, and the feedback signal may be used as a detection signal. However, when energy corresponding to the feedback signal 1 is greater than or equal to the third energy threshold, the feedback signal 1 includes some other voice information in addition to the information about the pilot signal, and energy of this part of voice information is relatively high. Therefore, the feedback signal 1 may be considered as the feedback signal corresponding to the non-silent audio signal, and may not be used as a detection signal. When energy corresponding to the feedback signal 1 is greater than the second energy threshold and less than the third energy threshold, the feedback signal 1 includes some other voice information in addition to the information about the pilot signal, and the feedback signal 1 may be considered as the feedback signal corresponding to the non-silent audio signal, and may not be used as a detection signal, or may be considered as the feedback signal corresponding to the silent audio signal, and may be used as a detection signal. This is not limited in the embodiments of this application.

4. Normal Admittance Value Range

The normal admittance value range is a range of an admittance value that is of a feedback signal (detection signal) corresponding to a silent audio signal in a target audio signal and that exists when a screen sound generator plays the target audio signal and the screen sound generator is normal. In some possible cases, the silent audio signal may be a pilot signal in the target audio signal. Energy of the silent audio signal is less than or equal to a second energy threshold (the second energy threshold has a very small value, and may be approximately −30 dB), and a frequency of the silent audio signal is greater than or equal to a first frequency threshold (the first frequency threshold is a frequency threshold of the pilot signal described above). This indicates that the silent audio signal carries very little voice information (equivalent to carrying no voice information) or no voice information. The feedback signal corresponding to the silent audio signal may be considered as a detection signal. For detailed description of the detection signal, refer to the foregoing related description of the detection signal. Details are not described herein.

The normal admittance value range is related to the screen sound generator, and therefore the normal admittance value range may also be referred to as an admittance value range corresponding to the screen sound generator.

In a possible implementation, a terminal may perform testing by using a plurality of samples of the screen sound generator under a normal condition, to determine reference admittance values corresponding to the different samples of the screen sound generator. Then, the terminal may select a largest reference admittance value and a smallest reference admittance value from the reference admittance values corresponding to the different samples, and use a range from the smallest reference admittance value to the largest reference admittance value as the normal admittance value range. A reference admittance value corresponding to a sample of the screen sound generator may be used to represent a range of an admittance value of the sample existing when a silent audio signal passes through the sample of the screen sound generator under the normal condition. For detailed description of this process, refer to the following description of step S301 to step S304. Details are not described herein.

5. Silent Frame Admittance Value

The silent frame admittance value may be used to describe a maximum admittance value corresponding to a feedback signal (detection signal) generated by using a silent audio signal in a target audio signal when a screen sound generator plays the target audio signal regardless of whether the screen sound generator is normal. That is, when an admittance value corresponding to a feedback signal corresponding to (generated by using) a frame of audio signal is greater than the silent frame admittance value, it indicates that the frame of audio signal is not a silent audio signal. The feedback signal corresponding to the silent audio signal may be interpreted as the detection signal described above.

The silent frame admittance value is related to the screen sound generator, and therefore the silent frame admittance value may also be referred to as a silent frame admittance value corresponding to the screen sound generator.

For a process of determining the silent frame admittance value by a terminal, refer to the following related description of step S601 to step S604. Details are not described herein.

Based on the foregoing principles and related concepts, a process of obtaining, by a terminal, a detection signal sequence from a feedback signal sequence corresponding to a target audio signal sequence played by a screen sound generator is described below (for detailed description of this process, refer to the following description of step S107).

First, the terminal may add a pilot signal with a high frequency and low energy to the target audio signal sequence. The high frequency means that the frequency of the pilot signal is greater than a first frequency threshold, and the low energy means that the energy of the pilot signal is less than a first energy threshold (the first energy threshold is very small, and may be approximately −30 dB). Then, the terminal may filter a feedback signal sequence corresponding to a target audio signal sequence obtained after the pilot signal is added, to filter out an audio signal whose frequency is less than that of the pilot signal, so as to obtain a filtered feedback signal sequence. Information about the pilot signal and information about an audio signal whose frequency is greater than that of the pilot signal are retained in the filtered feedback signal sequence. Then, the terminal determines all filtered feedback signals whose admittance values are less than a silent frame admittance value in the filtered feedback signal sequence as the detection signal sequence.

In conclusion, energy of the detection signal is relatively low, and therefore an admittance value determined by using the detection signal is not interfered with by energy of a non-silent audio signal, and the admittance value can truly reflect an admittance value that corresponds to a silent audio signal in a target audio signal and that exists when the screen sound generator plays the target audio signal. When the admittance value corresponding to the detection signal falls outside a normal admittance value range, it may be determined that a problem occurs in the screen sound generator.

It should be understood that for a principle of determining, by comparing an average admittance value determined by using the detection signal sequence with the normal admittance value range, whether the screen sound generator fails, refer to the foregoing description. Details are not described herein.

It may be learned, based on the foregoing description, that in the embodiment of this application, to determine whether a screen sound generator is normal, parameters that need to be obtained include the detection signal, the silent frame admittance value, and the normal admittance value range described above. An accidental calculation result is obtained by using one frame of detection signal. Therefore, the embodiments of this application focus on a process of determining, by detecting the screen sound generator by using a detection signal sequence, whether the screen sound generator is normal.

The silent frame admittance value and the normal admittance value range are results estimated by using a large amount of data. This process is described below in detail. Herein, it may be assumed that a terminal already obtains the silent frame admittance value and the normal admittance value range corresponding to the screen sound generator, and then detects the screen sound generator with reference to the detection signal sequence.

Scenarios in which the terminal obtains the detection signal sequence include but are not limited to the following scenarios:

Call scenario: The terminal displays an incoming call prompt, and in response to an operation (for example, a tap operation) on an answer control, the terminal may communicate with another terminal by using a call application. A user may start a call by using the terminal. In a call process of the user, the terminal continuously obtains a to-be-processed downlink audio signal to obtain a to-be-processed downlink audio signal sequence. The to-be-processed downlink audio signal is an audio signal that is sent by the another terminal to the terminal and that is received by the terminal. The terminal may process the to-be-processed downlink audio signal to obtain a downlink audio signal sequence (the downlink audio signal sequence is a processed downlink audio signal sequence, and unless otherwise specified, all downlink audio signal sequences in the following are processed downlink audio signal sequences). Then, the terminal may add a pilot signal to the downlink audio signal sequence, play, by using the screen sound generator, a downlink audio signal sequence obtained after the pilot signal is added, to obtain a feedback signal sequence (the feedback signal sequence is referred to as a downlink feedback signal sequence below), filter the downlink feedback signal sequence to obtain a filtered downlink feedback signal sequence, and determine all filtered downlink feedback signals whose admittance values are less than the silent frame admittance value in the filtered downlink feedback signal sequence as detection signals.

Music playing scenario: The terminal opens a music application, and in response to an operation (for example, a tap operation) on a play control, the terminal may play audio data (music) by using the screen sound generator. The audio data may be converted into an audio signal sequence to be played by the screen sound generator, and is used to replace the downlink audio signal sequence in the obtaining scenario 1. The terminal may obtain a detection signal by using the audio signal sequence (obtained by converting the audio data). For this process, refer to the description of the obtaining scenario 1. Details are not described herein.

It should be understood that in addition to the foregoing scenarios, a detection signal may be obtained in another scenario. This is not limited in the embodiments of this application. A process of performing screen detection by a terminal is described below in detail by using a call scenario as an example. For another scenario, refer to the description. Details are not described in the embodiments of this application.

Figure 4:
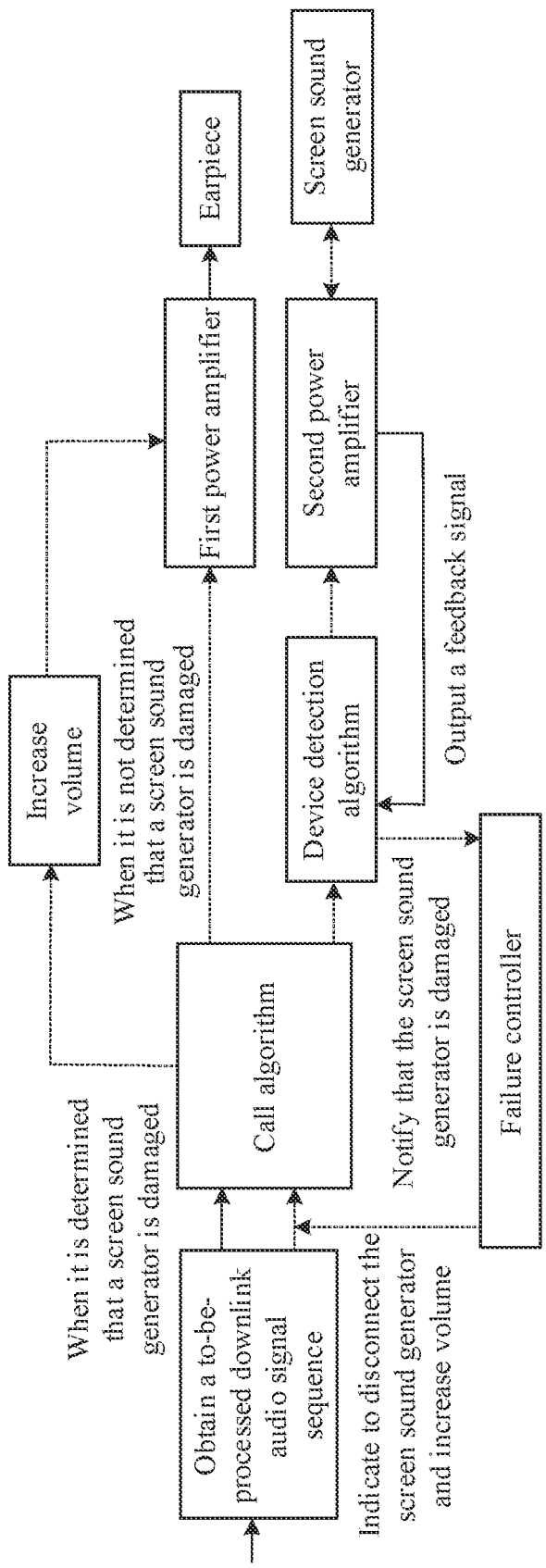
FIG. 4 is a schematic diagram of obtaining a detection signal to detect a screen sound generator in a call scenario.

FIG. 4 is a schematic diagram of obtaining a detection signal to detect the screen sound generator in a call scenario.

As shown in FIG. 4, in a call process of a user, a terminal continuously obtains a to-be-processed downlink audio signal to obtain a to-be-processed downlink audio signal sequence, and processes the downlink audio signal sequence by using a call algorithm to obtain two processed downlink audio signal sequences. The call algorithm may include a noise reduction algorithm, a tone adjustment algorithm (for example, an equalizer (EQ) algorithm), a volume adjustment algorithm (for example, a dynamic range control (DRC) algorithm), and the like.

The terminal may perform power amplification on one processed downlink audio signal sequence by using a first power amplifier, and drive an earpiece to play the processed downlink audio signal sequence. The terminal may add a pilot signal to the other processed downlink audio signal sequence (which is briefly referred to as a downlink audio signal sequence below) by using a device detection algorithm, to obtain a downlink audio signal sequence obtained after the pilot signal is added. Then, the terminal may perform power amplification on the downlink audio signal sequence by using a second power amplifier, and drive the screen sound generator to play the downlink audio signal sequence obtained after the pilot signal is added. In a process of playing, by the screen sound generator, the downlink audio signal sequence obtained after the pilot signal is added, the second power amplifier may be driven by using the downlink audio signal obtained after the pilot signal is added, to obtain a feedback signal sequence. The feedback signal sequence is the downlink feedback signal sequence described above. The feedback signal sequence may be referred to as a downlink feedback signal sequence below. Then, the terminal may use the downlink feedback signal sequence as an input parameter of the device detection algorithm, filter the downlink feedback signal sequence by using the device detection algorithm, determine a detection signal sequence based on a silent frame admittance value and a filtered feedback signal sequence, calculate an average admittance value of the detection signal sequence, and compare the average admittance value with a normal admittance value range. If the average admittance value falls within the normal admittance value range, the terminal determines that the screen sound generator is normal, or if the average admittance value falls outside the normal range, determines that the screen sound generator is damaged.

After determining, by using the device detection algorithm, whether the screen sound generator is damaged, the terminal may output a detection result to a failure controller. After determining that the screen sound generator is damaged, the failure controller may make a policy to resolve a problem (for example, a problem of generating noise) caused due to damage of the screen sound generator. The policy includes indicating the terminal to disconnect the screen sound generator. Specifically, the terminal may process a to-be-processed downlink audio signal by using the call algorithm, output only one downlink audio signal, increase volume of the downlink audio signal, and then drive, by using the first power amplifier, the earpiece to play the downlink audio signal, so that the screen sound generator cannot play a downlink audio signal, to reduce adverse impact, for example, impact that a played audio signal is unstable in volume or carries noise, caused due to damage of the screen sound generator.

It should be understood that a function of the device detection algorithm is to detect whether the screen sound generator is damaged, and the device detection algorithm may be implemented by hardware, software, or a combination thereof. This is not limited in the embodiments of this application. A function of the failure controller is to make a policy after the screen sound generator is damaged, to resolve the problem caused due to damage of the screen sound generator. The failure detector may also be implemented by hardware, software or a combination thereof. This is not limited in the embodiments of this application.

Figure 5A:
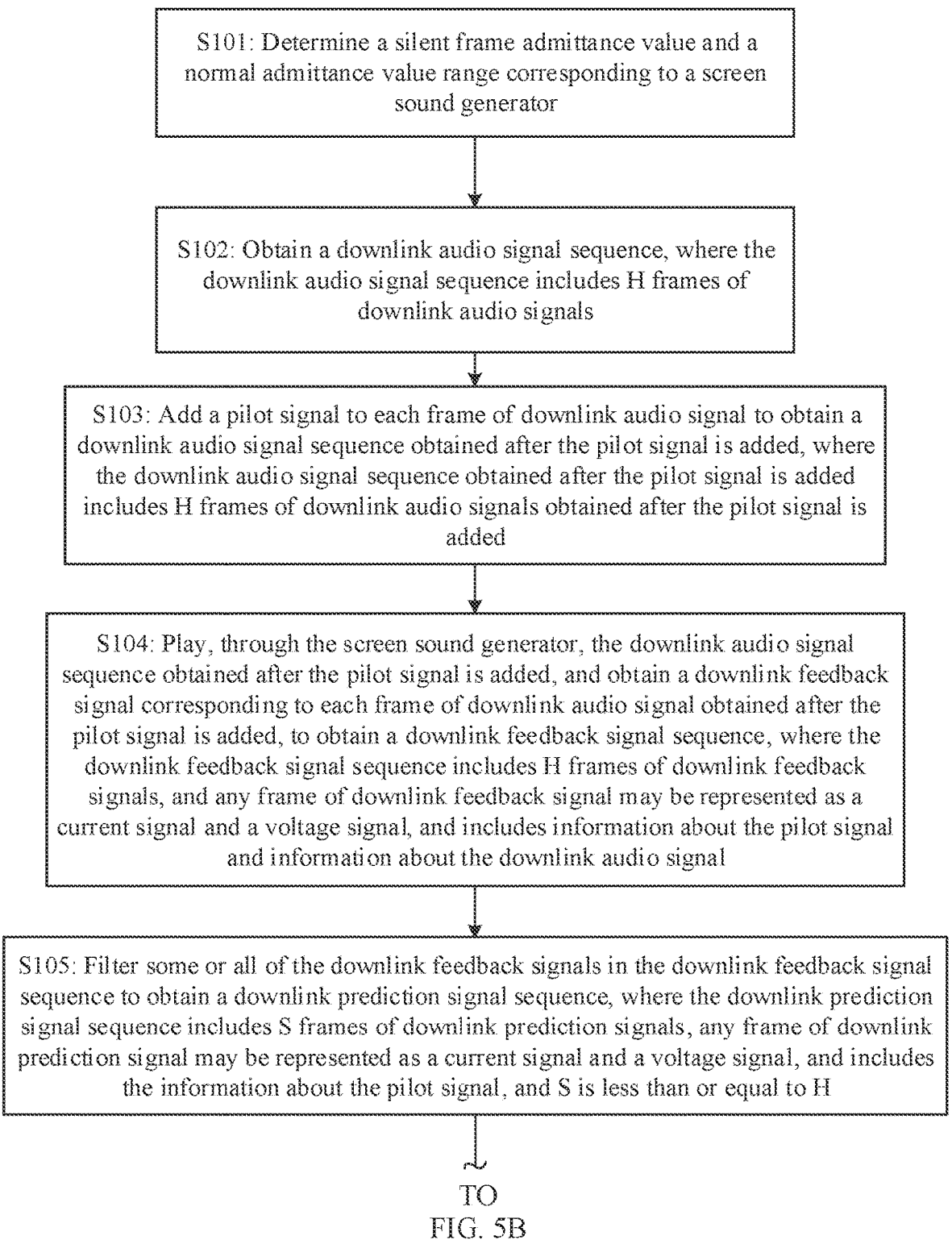
FIG. 5A and FIG. 5B are a schematic flowchart of detecting a screen sound generator by using a device detection method according to an embodiment of this application.
Figure 5B:
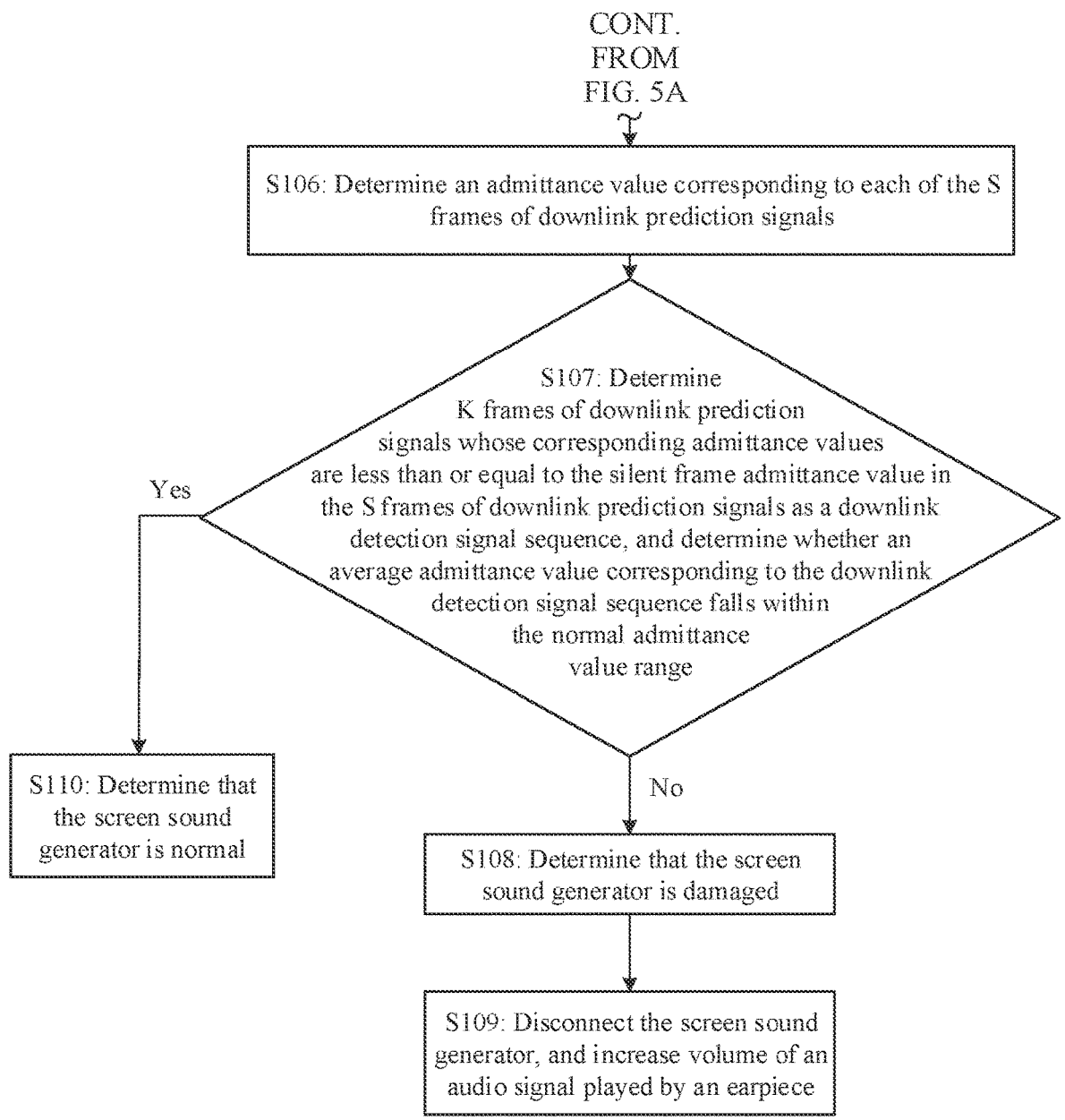

FIG. 5A and FIG. 5B are a schematic flowchart of detecting a screen sound generator by using a device detection method according to an embodiment of this application.

In some embodiments, in a process of communicating with another terminal by using a call application, a terminal may obtain an audio signal (downlink audio signal) for a time period to obtain a downlink audio signal sequence, obtain a detection signal sequence (downlink detection signal sequence) based on the downlink audio signal sequence, and determine, based on the downlink detection signal sequence, whether the screen sound generator is normal. For detailed description of this process, refer to the following description of step S101 to step S110.

S101: The terminal determines a silent frame admittance value and a normal admittance value range corresponding to the screen sound generator.

For description of the silent frame admittance value and the normal admittance value range, refer to the foregoing content. Details are not described herein.

The normal admittance value range and the silent frame admittance value in a process of detecting the screen sound generator by the terminal may be preset in the terminal, and are used to detect the screen sound generator. The terminal may update the normal admittance value range and the silent frame admittance value preset in the terminal.

For a process of determining the normal admittance value range by the terminal, refer to the subsequent description of step S301 to step S304. For a process of determining the silent frame admittance value by the terminal, refer to the subsequent description of step S601 to step S604. Details are not described herein.

S102: The terminal obtains a downlink audio signal sequence, where the downlink audio signal sequence includes H frames of downlink audio signals.

The downlink audio signal sequence may be the H frames of downlink audio signals obtained after a preprocessed downlink audio signal sequence is processed (for example, processed by using a call algorithm), and carries voice information. The voice information may be used to indicate a sound. The downlink audio signal sequence may be used to obtain a feedback signal in the following step S104. The preprocessed downlink audio signal sequence is a plurality of frames of audio signals continuously obtained in a call process when the terminal communicates with the another terminal by using the call application.

For a process of processing the preprocessed audio signal sequence to obtain the downlink audio signal sequence, refer to the foregoing related description of FIG. 4. Details are not described herein.

The downlink audio signal sequence may include the H frames of downlink audio signals. A specific time length of one frame of downlink audio signal may be determined based on a processing capability of the terminal, and usually may range from 10 ms to 50 ms, for example, a multiple of 10 ms such as 10 ms, 20 ms, or 30 ms.

It should be understood that the terminal may obtain a downlink audio signal for a time period at a first moment in the process of communicating with the another terminal by using the call application, to obtain the downlink audio signal sequence.

The time period may be set to is, $2s$, or the like, and a length of the time period constitutes no limitation on this embodiment of this application. A specific quantity of frames of downlink audio signals included in the downlink audio signal sequence is related to the time period. For example, when the first time period is 1s and one frame of downlink audio signal is 10 ms, 100 frames of downlink audio signals may be acquired to obtain the downlink audio signal sequence. In this case, a value of H used is 100.

The first moment may be any moment in the process of communicating, by the terminal, with the another terminal by using the call application, for example, a moment (start moment) at which communication is initially started or a later moment. This is not limited in this embodiment of this application.

S103: The terminal adds a pilot signal to each frame of downlink audio signal to obtain a downlink audio signal sequence obtained after the pilot signal is added, where the downlink audio signal sequence obtained after the pilot signal is added includes H frames of downlink audio signals obtained after the pilot signal is added.

The pilot signal is one or more frames of audio signals with a high frequency and low energy. The high frequency means that the frequency of the pilot signal is greater than a first frequency threshold. The first frequency threshold is usually greater than a frequency of a sound generated by a user, and a value range may be 18 kHz or more. The low energy means that the energy of the pilot signal is less than a first energy threshold (the first energy threshold has a very small value, and may be close to −30 dB). This indicates that the pilot signal is silent information or similar to silent information, and may not carry voice information.

The downlink audio signal carries voice information (which may indicate a sound generated by the user), and generally a frequency of an audio signal included in the downlink audio signal may be less than the frequency of the pilot signal. Therefore, when a downlink feedback signal corresponding to the downlink audio signal obtained after the pilot signal is added is filtered in the subsequent step S105, the frequency of the pilot signal may be used as a reference, and an audio signal whose frequency is less than that of the pilot signal may be filtered out. In this way, a downlink prediction signal that carries a small amount of voice information or that carries no voice information can be obtained, and in some possible cases, a downlink prediction signal that includes only information about the pilot signal can be obtained. For detailed description of this process, refer to the following description of step S105. Details are not described herein.

The downlink audio signal in step S103 may be considered as the preprocessed audio signal described above. The downlink audio signal sequence obtained after the pilot signal is added may be considered as the target audio signal described above. For a process of adding, by the terminal, the pilot signal to each frame of downlink audio signal to obtain the downlink audio signal sequence obtained after the pilot signal is added, refer to the foregoing description of FIG. 2 and related content. Details are not described herein.

S104: The terminal plays, through the screen sound generator, the downlink audio signal sequence obtained after the pilot signal is added, and obtains a downlink feedback signal corresponding to each frame of downlink audio signal obtained after the pilot signal is added, to obtain a downlink feedback signal sequence, where the downlink feedback signal sequence includes H frames of downlink feedback signals, and any frame of downlink feedback signal may be represented as a current signal and a voltage signal, and includes information about the pilot signal and information about the downlink audio signal.

The downlink feedback signal sequence includes the H frames of downlink feedback signals.

Description is provided below by using an example in which one frame of downlink audio signal obtained after the pilot signal is added is used to obtain one frame of feedback signal. For a process of using the downlink audio signal sequence obtained after the pilot signal is added to obtain the downlink feedback signal sequence, refer to the description.

The downlink feedback signal is a current signal and a voltage signal (generated by a power amplifier) generated when the downlink audio signal obtained after the pilot signal is added drives, in a process in which the screen sound generator converts the downlink audio signal obtained after the pilot signal is added into an electrical signal (analog electrical signal) for playing, the power amplifier connected to the screen sound generator. The current signal may include corresponding current information existing when the screen sound generator plays the downlink audio signal obtained after the pilot signal is added, and the voltage signal may include corresponding voltage information existing when the screen sound generator plays the downlink audio signal obtained after the pilot signal is added. Therefore, an admittance value corresponding to the downlink feedback signal may reflect an admittance value existing when the screen sound generator plays the downlink audio signal obtained after the pilot signal is added. The admittance value existing when the screen sound generator plays the downlink audio signal obtained after the pilot signal is added may reflect a capability of the screen sound generator to allow the electrical signal to pass, and may be used to detect whether the screen sound generator is normal. For description of the admittance value, refer to the foregoing related content. Details are not described herein.

Specifically, when playing, through the screen sound generator, the downlink audio signal obtained after the pilot signal is added, the terminal converts the downlink audio signal obtained after the pilot signal is added into an electrical signal (analog electrical signal) for playing. The electrical signal may be referred to as an electrical signal generated by using the downlink audio signal obtained after the pilot signal is added. In a play process, the electrical signal generated by using the downlink audio signal obtained after the pilot signal is added may drive the power amplifier connected to the screen sound generator. Then, the power amplifier samples the electrical signal generated by using each frame of downlink audio signal obtained after the pilot signal is added, to obtain the downlink feedback signal. The downlink feedback signal may include information about the downlink audio signal obtained after the pilot signal is added (including the information about the pilot signal and the information about the downlink audio signal). The downlink feedback signal may include a current signal (digital current signal) and a voltage signal (digital voltage signal). The current signal included in the feedback signal may be represented as B sampling points, and one sampling point may include a time and a current value. The time represents a time at which the sampling point is obtained, and the current value represents a magnitude of a current corresponding to an electrical signal corresponding to the sampling point. The voltage signal included in the feedback signal may be represented as B sampling points, and one sampling point may include a time and a voltage value. The time represents a time at which the sampling point is obtained, and the voltage value represents a magnitude of a voltage corresponding to an electrical signal corresponding to the sampling point. The electrical signal corresponding to the sampling point is an electrical signal generated when the screen sound generator plays the downlink audio signal.

The feedback signal sequence is denoted as signal(i)=[$I'_{i1}$, $I'_{i2}$, $I'_{i3}$, ..., $I'_{iB}$, $V'_{i1}$, $V'_{i2}$, $V'_{i3}$, ..., $V'_{iB}$]. Herein, i={i∈N+|1≤i≤H}, signal(i) represents an ith frame of feedback signal, [$I'_{i1}$, $I'_{i2}$, $I'_{i3}$, ..., $I'_{iB}$] represents a current signal included in the ith frame of feedback signal, $I'_{ij}$ represents a current value of a jth sampling point in the current signal included in the ith frame of feedback signal, [$V'_{i1}$, $V'_{i2}$, $V'_{i3}$, ..., $V'_{iB}$] represents a voltage signal included in the ith frame of feedback signal, and $I'_{ij}$ represents a voltage value of a jth sampling point in the voltage signal included in the ith frame of feedback signal.

S105: The terminal filters some or all of the downlink feedback signals in the downlink feedback signal sequence to obtain a downlink prediction signal sequence, where the downlink prediction signal sequence includes S frames of downlink prediction signals, any frame of downlink prediction signal may be represented as a current signal and a voltage signal, and includes the information about the pilot signal, and S is less than or equal to H.

Description is provided below by using an example in which one frame of downlink feedback signal is filtered to obtain one frame of downlink prediction signal. For a process of filtering some or all of the downlink feedback signals in the downlink feedback signal sequence to obtain the downlink prediction signal sequence, refer to the description.

The downlink prediction signal is a filtered downlink feedback signal.

In step S105, filtering is performed to filter out information about an audio signal other than the pilot signal in the feedback signal, to obtain the downlink prediction signal, so that the downlink prediction signal includes the only information about the pilot signal. In this way, the downlink prediction signal may not carry voice information, and therefore has low energy, and can be used as a detection signal to determine whether the screen sound generator is damaged. However, in actual application, the downlink prediction signal still includes some other information (for example, some information about the downlink audio signal) in addition to the information about the pilot signal. In this case, an admittance value corresponding to the prediction signal may be calculated in the following step S105, and a comparison with the silent frame admittance value is made based on the admittance value corresponding to the prediction signal. If the admittance value corresponding to the prediction signal is less than the silent frame admittance value, the downlink prediction signal may be used as a detection signal to determine whether the screen sound generator is damaged. For related description of the silent frame admittance value, refer to the foregoing content and the related description of the following step S107.

For a process of filtering the downlink feedback signal to obtain the filtered downlink feedback signal (downlink prediction signal), refer to the foregoing description of FIG. 3 and the related content. Details are not described herein.

In a possible case, whether the terminal specifically filters some or all of the downlink feedback signals in the downlink feedback signal sequence is related to a start moment at which the preprocessed downlink audio signal is obtained. The start moment is the first moment.

If the first moment is the start moment in the process of communicating, by the terminal, with the another terminal by using the call application, the terminal may filter some of the downlink feedback signals in the downlink feedback signal sequence. The some downlink feedback signals are feedback signals sampled at a later time. That is, the first C frames of downlink feedback signals in the H frames of downlink feedback signals are not processed, and only the (H−C) frames of downlink feedback signals are processed. In this case, S is equal to H−C. This is because the process of using the preprocessed audio signal to generate the feedback signal is affected by a factor such as circuit instability at an initial stage and another factor, and consequently admittance values calculated by using downlink prediction signals obtained after the first C frames of feedback signals are filtered fluctuate (become larger or smaller). For example, a feedback signal that is generated by using the preprocessed audio signal and that is obtained at the initial stage may carry information about noise caused due to circuit instability. The information about this part of noise has a frequency greater than that of the pilot signal, and cannot be filtered out when feedback signal is filtered, and a filtered downlink prediction signal still includes the information about this part of noise. Consequently, an admittance value corresponding to the filtered downlink prediction signal is relatively large, and is of no reference value, and therefore there is no need to calculate the admittance value in a subsequent step. This initial stage further affects stability of the pilot signal.

If the first moment is a moment later than the start moment in the process of communicating, by the terminal, with the another terminal by using the call application, and the process of using the preprocessed audio signal to generate the feedback signal is not affected by a factor such as circuit instability, the terminal may filter all of the downlink feedback signals in the downlink feedback signal sequence. In this case, S is equal to H.

The downlink prediction signal sequence is denoted as Psignal(i)=[Ii1, Ii2, Ii3, . . . , IiB, Vi1, Vi2, Vi3, . . . , ViB]. Herein, i={i∈N+|1≤i≤S}, S is less than or equal to H, Psignal(i) represents an ith frame of downlink prediction signal, [Ii1, Ii2, Ii3, . . . , IiB] represents a current signal included in the ith frame of downlink prediction signal, Iij represents a current value of a jth sampling point in the current signal included in the ith frame of downlink prediction signal, [Vi1, Vi2, Vi3, . . . , ViB] represents a voltage signal included in the ith frame of downlink prediction signal, and Vij represents a voltage value of a jth sampling point in the voltage signal included in the ith frame of downlink prediction signal.

S106: The terminal determines an admittance value corresponding to each of the S frames of downlink prediction signals.

The admittance value corresponding to each frame of downlink prediction signal may include information about a current value and a voltage value corresponding to the frame of downlink prediction signal, and the admittance value may reflect an admittance value of the screen sound generator existing when an audio signal used for generating the frame of downlink prediction signal passes through the screen sound generator.

Description is provided below by using an example in which the terminal determines an admittance value corresponding to one frame of downlink prediction signal. For a process of determining an admittance value corresponding to another frame of downlink prediction signal, refer to this process.

In some embodiments, the admittance value corresponding to the frame of downlink prediction signal may be a ratio of a current value to a voltage value corresponding to the frame of downlink prediction signal. The current value corresponding to the frame of downlink prediction signal includes information about current values of all sampling points in a current signal corresponding to the frame of downlink detection signal. The voltage value corresponding to the frame of downlink prediction signal includes information about voltage values of all sampling points in a voltage signal corresponding to the frame of downlink detection signal.

For a related formula for determining the current value corresponding to the frame of downlink detection signal by the terminal, refer to the following formula (1):

$$I_{Psignal(i)} = \sqrt{\sum_{j=1}^{B}(I_{ij})^2} \qquad \text{formula (1)}$$

In the formula (1), i represents that the frame of downlink detection signal is an ith frame of downlink detection signal in the downlink detection signal sequence, $I_{Psignal(i)}$ represents the current value corresponding to the ith frame of downlink detection signal, $I_{ij}$ represents a current value of a jth sampling point in the current signal included in the ith frame of downlink prediction signal, and B represents a frame length of the ith frame of downlink prediction signal, that is, the current signal included in the ith frame of downlink prediction signal includes B sampling points.

For a related formula for determining the voltage value corresponding to the frame of downlink detection signal by the terminal, refer to the following formula (2):

$$V_{Psignal(i)} = \sqrt{\sum_{j=1}^{B}(V_{ij})^2} \qquad \text{formula (2)}$$

In the formula (2), i represents that the frame of downlink detection signal is an ith frame of downlink detection signal in the downlink detection signal sequence, $V_{Psignal(i)}$ represents the voltage value corresponding to the ith frame of downlink detection signal, $V_{ij}$ represents a voltage value of a jth sampling point in the voltage signal included in the ith frame of downlink prediction signal, and B represents a frame length of the ith frame of downlink prediction signal, that is, the voltage signal included in the ith frame of downlink prediction signal includes B sampling points.

For a related formula for determining the admittance value corresponding to the frame of downlink detection signal by the terminal, refer to the following formula (3):

$$G_{Psignal(i)} = \frac{I_{Psignal(i)}}{V_{Psignal(i)}} \qquad \text{formula (3)}$$

In some other embodiments, to enhance robustness of the admittance value corresponding to the frame of downlink prediction signal and an admittance value corresponding to another frame of downlink detection signal, and reduce inaccuracy of the admittance value caused due to impact of a factor such as circuit instability, the admittance value corresponding to the frame of downlink prediction signal may be associated with an admittance value corresponding to a previous frame of downlink prediction signal to determine the admittance value corresponding to the frame of downlink prediction signal. The association means that the admittance value corresponding to the frame of downlink prediction signal may be a combination of the admittance value corresponding to the previous frame of downlink prediction signal and the admittance value corresponding to the frame of downlink prediction signal. In a combination process, a first weight (denoted as a) may be set for the admittance value corresponding to the frame of downlink prediction signal, and a second weight (denoted as 1-a) may be set for the admittance value corresponding to the previous frame of downlink prediction signal. Generally, a sum of the first weight and the second weight is 1.

For a related formula for determining the admittance value corresponding to the frame of downlink detection signal by the terminal, refer to the following formula (4):

$$G_{Psignal(i)} = (1-a) \times G_{Psignal(i-1)} + a \times G_{Psignal(i)} \qquad \text{formula (4)}$$

In the formula (4), i represents that the frame of downlink detection signal is an ith frame of downlink detection signal in the downlink detection signal sequence, and (i−1) represents a previous frame of downlink prediction signal of the ith frame of downlink detection signal. The previous frame of downlink prediction signal may be a downlink detection signal that is separated from the ith frame of downlink detection signal by V frames in terms of collection time. Herein, V is a positive integer greater than or equal to 1, and V=1 is usually used. Description is provided below by using V=1 as an example. For another case, refer to the description. Herein, $G_{Psignal(i)}$ on the left of the equal sign represents the admittance value corresponding to the ith frame of downlink detection signal, and $G_{Psignal(i)}$ on the right of the equal sign represents an admittance value corresponding to the ith frame of downlink detection signal before the association (a is the weight of the admittance value before the association). The admittance value before the association may be determined by using the formulas (1), (2), and (3). Herein, $G_{Psignal(i-1)}$ on the right of the equal sign represents the admittance value corresponding to the previous frame of downlink prediction signal of the ith frame of downlink detection signal (1-a is the weight of the admittance value).

It should be understood that in the formula (4), the formula is not applicable when i=1. In this case, when i=1, an admittance value corresponding to the first frame of downlink detection signal may be directly calculated by using the formulas (1), (2), and (3).

S107: The terminal determines K frames of downlink prediction signals whose corresponding admittance values are less than or equal to the silent frame admittance value in the S frames of downlink prediction signals as a downlink detection signal sequence, and determines whether an average admittance value corresponding to the downlink detection signal sequence falls within the normal admittance value range.

The normal admittance value range is a range of an admittance value of the screen sound generator existing when the screen sound generator plays a silent audio signal and the screen sound generator is normal.

The silent frame admittance value is a maximum admittance value of the screen sound generator existing when the screen sound generator plays the silent audio signal.

The admittance value of the screen sound generator existing when the screen sound generator plays the silent audio signal may be represented by an admittance value corresponding to a feedback signal corresponding to the silent audio signal, and the feedback signal corresponding to the silent audio signal is a downlink detection signal, and may be used. The silent audio signal is an audio signal whose energy is less than or equal to a second energy threshold and whose frequency is greater than or equal to a first frequency threshold (the first frequency threshold is a frequency threshold of the pilot signal described above). The second energy threshold may be greater than or equal to the first energy threshold described above. When the second energy threshold is equal to the first energy threshold, it indicates that the downlink prediction signal obtained by filtering the feedback signal in step S105 can be used as a downlink detection signal only when the downlink prediction signal includes only the information about the pilot signal. When the second energy threshold is greater than the first energy threshold, it indicates that the downlink prediction signal obtained by filtering the feedback signal in step S105 may include information about another audio signal in addition to the information about the pilot signal, and the downlink prediction signal can be used as a downlink detection signal only when energy of the another audio signal is less than or equal to a difference between the second energy threshold and the first energy threshold. That is, in this embodiment of this application, when the second energy threshold is equal to the first energy threshold, the pilot signal may be considered as a silent audio signal.

It may be learned, based on the foregoing description, that when an admittance value corresponding to a frame of downlink prediction signal is less than or equal to the silent frame admittance value, it indicates that information about an audio signal included in the frame of downlink detection signal is information about a silent audio signal, and the frame of downlink prediction signal can be used as a detection signal to determine whether the screen sound generator is normal. When an admittance value corresponding to a frame of downlink prediction signal is greater than the silent frame admittance value, it indicates that information about an audio signal included in the frame of downlink detection signal is not information about a silent audio signal, and the frame of downlink prediction signal cannot be used as a detection signal to determine whether the screen sound generator is normal.

The terminal determines the K frames of downlink prediction signals whose corresponding admittance values are less than or equal to the silent frame admittance value in the S frames of downlink prediction signals as the downlink detection signal sequence. The downlink detection signal sequence is denoted as Dsignal(i)=[Ii1, Ii2, Ii3, . . . , IiB, Vi1, Vi2, Vi3, . . . , ViB]. Herein, i={i∈N+|1≤i≤K}, K is less than or equal to S, Dsignal(i) represents an ith frame of downlink detection signal, [Ii1, Ii2, Ii3, . . . , IiB] represents a current signal included in the ith frame of downlink detection signal, Iij represents a current value of a jth sampling point in the current signal included in the ith frame of downlink detection signal, [Vi1, Vi2, Vi3, . . . , ViB] represents a voltage signal included in the ith frame of downlink detection signal, and $V_{ij}$ represents a voltage value of a jth sampling point in the voltage signal included in the ith frame of downlink detection signal.

The terminal determines the average admittance value of the downlink detection signal sequence, and determines whether the average admittance value of the downlink detection signal sequence falls within the normal admittance value range.

For a related formula for determining the average admittance value of the downlink detection signal sequence by the terminal, refer to the following formula (5):

$$fG_{Dsignal} = \frac{\sum_{i=1}^{K} G_{Dsignal(i)}}{K} \qquad \text{formula (5)}$$

In the formula (5), $fG_{Dsignal}$ represents the average admittance value of the downlink detection signal sequence, $G_{Dsignal(i)}$ represents an admittance value corresponding to the ith frame of downlink detection signal, and K represents that there are K frames of downlink detection signals.

When the average admittance value of the downlink detection signal sequence falls outside the normal admittance value range, the terminal performs step S108 of determining that the screen sound generator is abnormal. When the average admittance value of the downlink detection signal sequence falls within the normal admittance value range, the terminal performs step S110 of determining that the screen sound generator is normal.

It should be understood that step S107 is optional. After step S106, the terminal may determine K frames of downlink prediction signals whose corresponding admittance values are less than the silent frame admittance value in the S frames of downlink prediction signals as a downlink detection signal sequence, and then determine whether a value of K is greater than a preset quantity of silent frames. When the value of K is greater than or equal to the preset quantity of silent frames, the terminal may determine, based on the downlink detection signal sequence, whether the screen sound generator is normal. When the value of K is less than or equal to the preset quantity of silent frames, it may be considered that the downlink detection signal sequence includes an excessively small quantity of downlink detection signals, and an average admittance value calculated based on the downlink detection signal sequence is of no reference value. Therefore, the terminal cannot determine, based on the downlink detection signal, whether the screen sound generator is normal, and may wait to obtain a downlink audio signal sequence during a next call, obtain a downlink detection signal sequence based on the downlink audio signal sequence, and then determine whether the screen sound generator is normal.

The preset quantity of silent frames may be H, H, or the like, and may be adjusted based on an actual situation. For a process of obtaining the K frames of downlink detection signals by the terminal, refer to the related description of step S107. Details are not described herein.

S108: The terminal determines that the screen sound generator is damaged.

When the average admittance value of the downlink detection signal sequence falls outside the normal admittance value range, that the terminal determines that the screen sound generator is abnormal may further include: if the average admittance value of the downlink detection signal sequence is greater than all admittance values in the normal admittance value range, determining that a first type of abnormality occurs in the screen sound generator, where the first type of abnormality causes the admittance value to be increased when the screen sound generator plays the silent audio signal, and the first type of abnormality may include that a short circuit occurs in the screen sound generator; or if the average admittance value of the downlink detection signal sequence is less than all admittance values in the normal admittance value range, determining that a second type of abnormality occurs in the screen sound generator, where the second type of abnormality causes the admittance value to be decreased when the screen sound generator plays the silent audio signal, and the second type of abnormality may include that an open circuit occurs in the screen sound generator.

S109: The terminal disconnects the screen sound generator, and increases volume of an audio signal played by an earpiece.

Step S109 is optional.

In step S109, the terminal no longer plays an audio signal through the screen sound generator, plays the audio signal only through the earpiece, and increases energy of the audio signal played by the earpiece, so that the user can clearly hear a sound.

It should be understood that when determining that the screen sound generator is damaged, the terminal may use another manner to eliminate impact caused due to damage of the screen sound generator. For example, the terminal may display prompt information to notify the user that the screen sound generator is damaged, and may advise the user to repair the screen sound generator in a nearby service center.

S110: The terminal determines that the screen sound generator is normal.

Figure 6A:
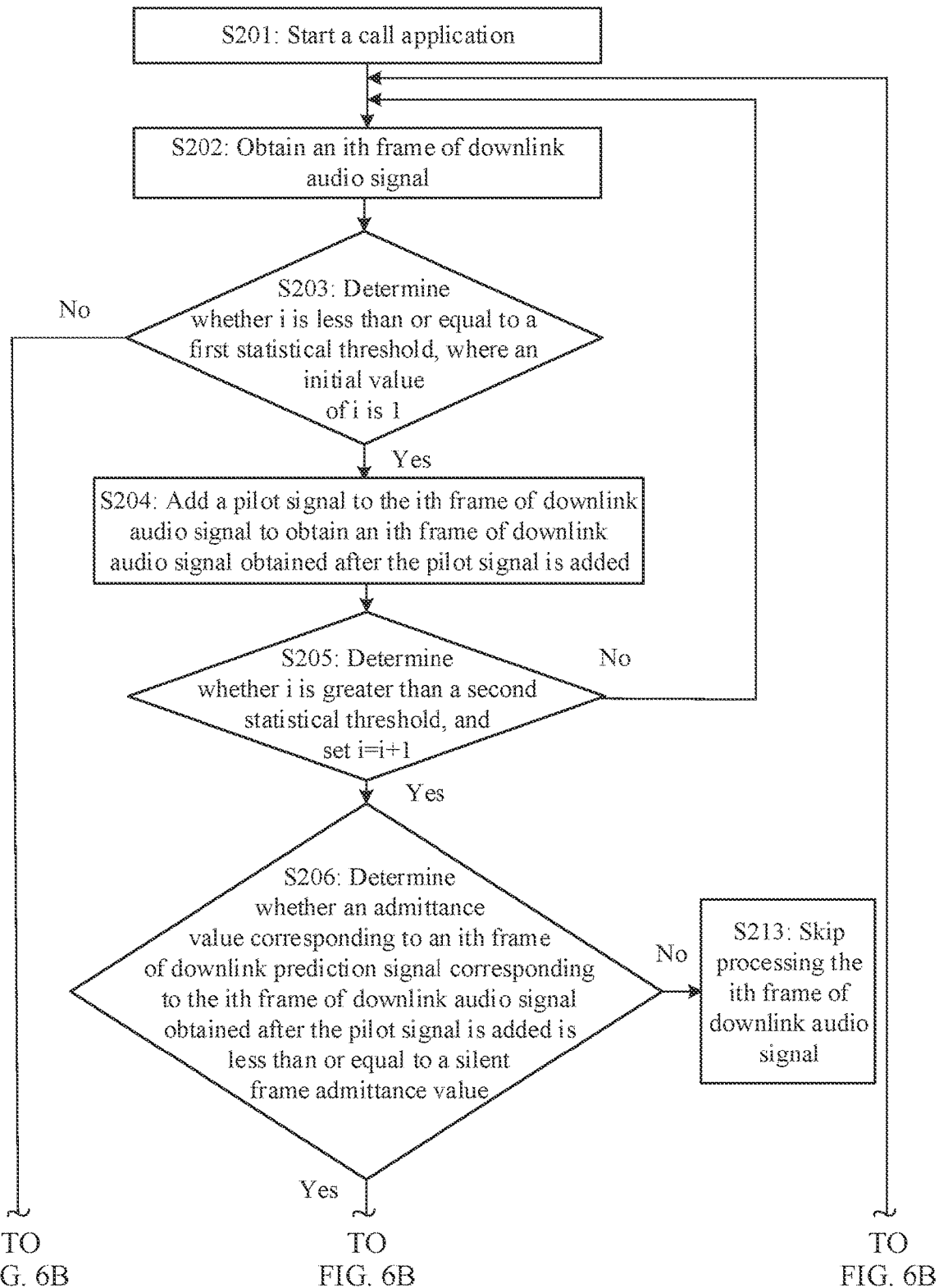
FIG. 6A and FIG. 6B are another schematic flowchart of detecting a screen sound generator by using a device detection method according to an embodiment of this application.
Figure 6B:
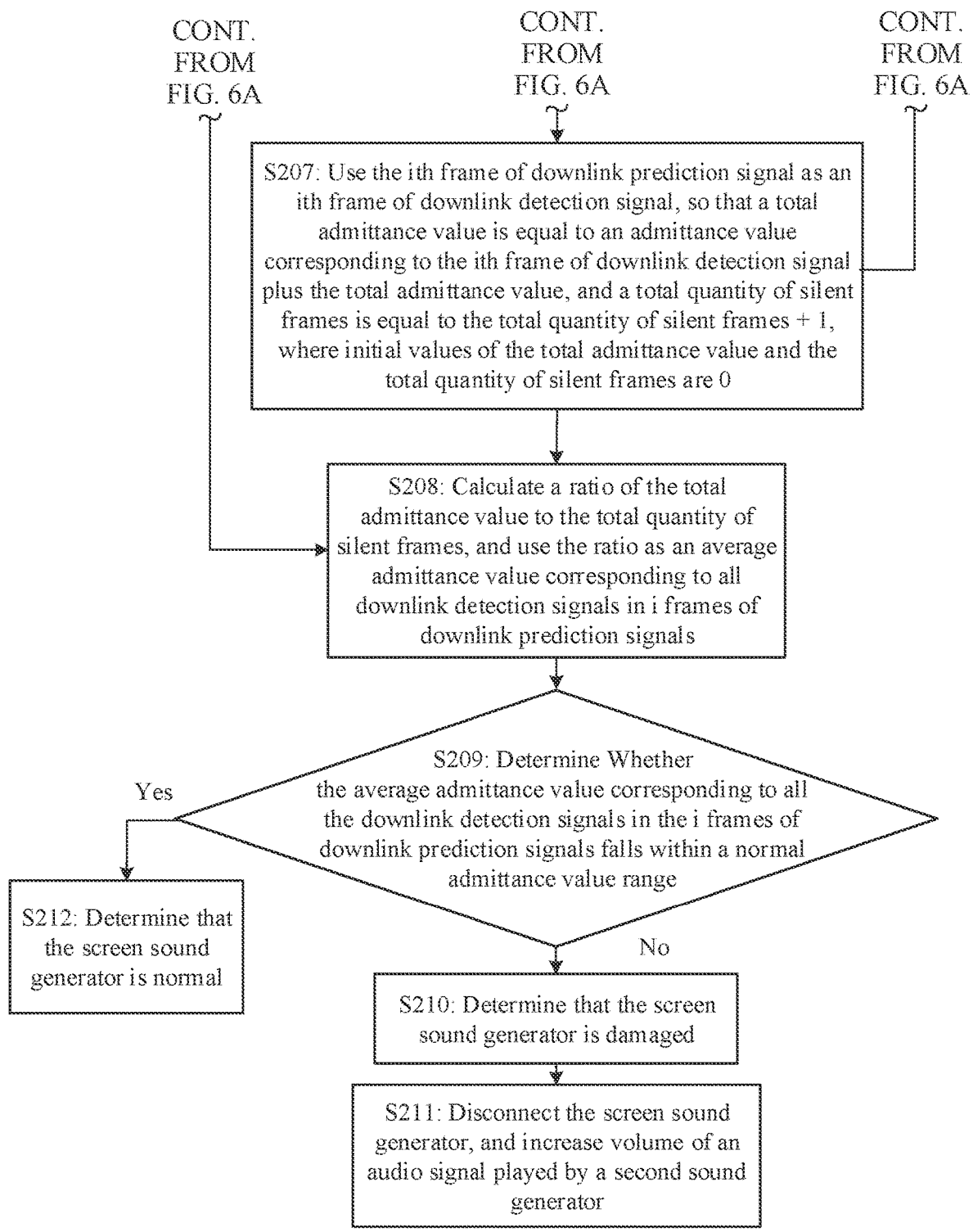

FIG. 6A and FIG. 6B are another schematic flowchart of detecting a screen sound generator by using a device detection method according to an embodiment of this application.

In some embodiments, a terminal may start to obtain a downlink audio signal at a second moment in a process of communicating with another terminal by using a call application, and process the downlink audio signal to obtain a frame of downlink detection signal. This process may end at a third moment. Then, the terminal counts an average admittance value corresponding to all downlink detection signals obtained from the second moment to the third moment, and determines, based on the average admittance value, whether the screen sound generator is normal. The second moment may be the same as the first moment described above, and there may be F frames of downlink audio signals between the third moment and the second moment. Herein, F may be 100, 200, or the like, is adjusted based on an actual situation, and constitutes no limitation on this embodiment of this application. A process in which the terminal detects whether the screen sound generator is normal is described below in detail by using an example in which the second moment is a moment at which the call application is started and F is 100.

For detailed description of this process, refer to the following description of step S201 to step S213.

S201: The terminal starts the call application.

At the second moment, the terminal displays an incoming call prompt, and in response to an operation (for example, a tap operation) on an answer control, the terminal may communicate with the another terminal by using the call application. A user may start a call by using the terminal.

S202: The terminal obtains an ith frame of downlink audio signal.

After starting the call application, the terminal may obtain the ith frame of downlink audio signal. For related description of the downlink audio signal and details about a process of obtaining the downlink audio signal, refer to the foregoing description of step S102. Details are not described herein.

S203: The terminal determines whether i is less than or equal to a first statistical threshold, where an initial value of i is 1.

The first statistical threshold is used to control a specific quantity of frames of downlink audio signals to be obtained by the terminal to generate a downlink detection signal sequence to complete detection of the screen sound generator. The first statistical threshold is the quantity K of frames of downlink audio signals between the third moment and the second moment. The first statistical threshold is 100, 200, or the like, is adjusted based on an actual situation, and constitutes no limitation on this embodiment of this application.

In description of step S203, the terminal may obtain the first K (first statistical threshold) frames of downlink audio signals obtained after the call application is started, to determine whether the screen sound generator is damaged. When the quantity of downlink audio signals obtained by the terminal reaches K, the terminal may perform the following step S204. After obtaining the K frames of downlink audio signals, the terminal may perform the following step S208 to determine, based on detection signals obtained based on the K frames of downlink audio signals, whether the screen sound generator is normal.

S204: The terminal adds a pilot signal to the ith frame of downlink audio signal to obtain an ith frame of downlink audio signal obtained after the pilot signal is added.

For related description of step S204, refer to the foregoing description of step S103. Details are not described herein.

S205: The terminal determines whether i is greater than a second statistical threshold, and sets i=i+1.

The second statistical threshold may be set to 5, 10, or the like, and may be adjusted based on an actual situation. This is not limited in this embodiment of this application.

Step S205 is optional. In another embodiment, the terminal may not determine whether i is greater than the second statistical threshold, and directly set i=i+1.

During a time period (for example, 0 s-0.1 s) in which the terminal has just started to communicate with the another terminal by using the call application, an admittance value of the screen sound generator may fluctuate due to a factor such as circuit instability, and it is not suitable to use a downlink audio signal obtained in this case to generate a downlink detection signal to detect whether the screen sound generator is damaged. Therefore, when i is not greater than the second statistical threshold, the ith frame of downlink audio signal is not processed, and the terminal re-performs step S202 to obtain a next frame of downlink audio signal.

When determining that i is greater than the second statistical threshold, the terminal may perform the following step S206.

S206: The terminal determines whether an admittance value corresponding to an ith frame of downlink prediction signal corresponding to the ith frame of downlink audio signal obtained after the pilot signal is added is less than or equal to a silent frame admittance value.

The terminal may obtain the ith frame of downlink prediction signal based on the ith frame of downlink audio signal obtained after the pilot signal is added. For this process, refer to the related description of step S104 and step S105. Details are not described herein.

Then, the terminal determines whether the admittance value corresponding to the ith frame of downlink prediction signal corresponding to the ith frame of downlink audio signal obtained after the pilot signal is added is less than the silent frame admittance value. For a process of determining the admittance value corresponding to the ith frame of downlink prediction signal by the terminal, refer to the foregoing description of step S106. For description of determining, by the terminal, whether the admittance value corresponding to the ith frame of downlink prediction signal is less than or equal to the silent frame admittance value, refer to the foregoing description of the related content in step S107.

When the terminal determines that the admittance value corresponding to the ith frame of downlink prediction signal corresponding to the ith frame of downlink audio signal obtained after the pilot signal is added is greater than or equal to the silent frame admittance value, the terminal may perform the following step S213.

When the terminal determines that the admittance value corresponding to the ith frame of downlink prediction signal corresponding to the ith frame of downlink audio signal obtained after the pilot signal is added is less than or equal to the silent frame admittance value, the terminal may perform the following step S207.

S207: The terminal uses the ith frame of downlink prediction signal as an ith frame of downlink detection signal, so that a total admittance value is equal to an admittance value corresponding to the ith frame of downlink detection signal plus the total admittance value, and a total quantity of silent frames is equal to the total quantity of silent frames+1, where initial values of the total admittance value and the total quantity of silent frames are 0.

In step S207, the terminal may count the total admittance value and the total quantity of silent frames. The total admittance value is a sum of admittance values corresponding to all the detection signals obtained based on the first K frames of downlink audio signals, and the total quantity of silent frames is a total quantity of frames of all the detection signals.

S208: The terminal calculates a ratio of the total admittance value to the total quantity of silent frames, and uses the ratio as an average admittance value corresponding to all downlink detection signals in i frames of downlink prediction signals.

S209: The terminal determines whether the average admittance value corresponding to all the downlink detection signals in the i frames of downlink prediction signals falls within a normal admittance value range.

Step S209 is similar to the process in which the terminal determines whether the average admittance value corresponding to the downlink detection signal sequence falls within the normal admittance value range in step S107.

Reference may be made to the description of the related content in step S107. Details are not described herein.

S210: The terminal determines that the screen sound generator is damaged.

Step S210 is the same as step S108. Reference may be made to the description of step S108. Details are not described herein.

S211: The terminal disconnects the screen sound generator, and increases volume of an audio signal played by a second sound generator.

Step S211 is the same as step S108. Reference may be made to the description of step S109. Details are not described herein.

S212: The terminal determines that the screen sound generator is normal.

It should be understood that step S204 may alternatively be performed after step S205 and before step S206.

S213: The terminal skips processing the ith frame of downlink audio signal.

A process of determining a normal admittance value range and a silent frame admittance value by a terminal in an embodiment of this application is described below.

The normal admittance value range is a range of an admittance value of the screen sound generator existing when the screen sound generator plays a silent audio signal and the screen sound generator is normal.

The silent frame admittance value is a maximum admittance value of the screen sound generator existing when the screen sound generator plays the silent audio signal.

For related description of the normal admittance value range and the silent frame admittance value, refer to the foregoing description of the related content. Details are not described herein.

Figure 7:
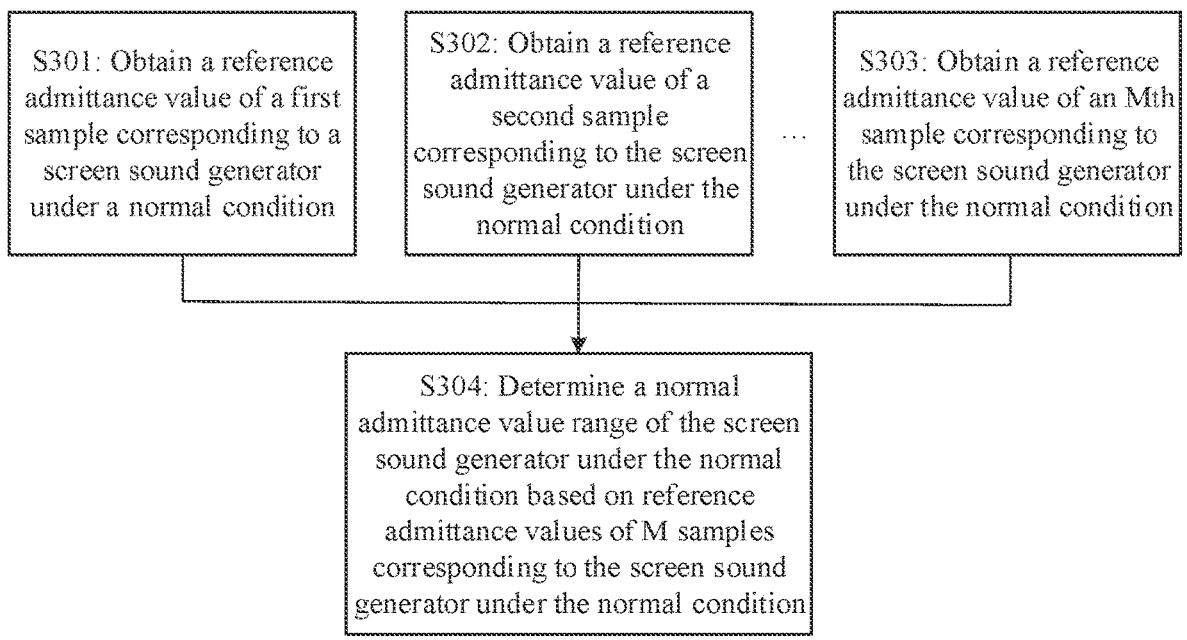
FIG. 7 is a schematic flowchart of determining a normal admittance value range by a terminal.

FIG. 7 is a schematic flowchart of determining a normal admittance value range by a terminal.

In a possible implementation, the terminal determines the normal admittance value range in the following manner: The terminal separately plays a reference audio signal sequence through different samples of a screen sound generator under a normal condition, to obtain reference feedback signal sequences corresponding to the reference audio signal sequence, filters the reference feedback signal sequences to obtain silent reference prediction signal sequences, and determines average admittance values corresponding to the silent reference prediction signal sequences under the normal condition. The terminal may use the average admittance values respectively obtained by using the different samples of the screen sound generator as reference admittance values corresponding to the different samples. Then, the terminal may select a largest reference admittance value and a smallest reference admittance value from the reference admittance values corresponding to the different samples, and use a range from the smallest reference admittance value to the largest reference admittance value as the normal admittance value range.

The reference audio signal sequence includes N frames of reference audio signals, and the frame of reference audio signal is an audio signal used in a process of determining the normal admittance value range by the terminal. An obtaining manner and a function of the audio signal are the same as those of the downlink audio signal described above. Reference may be made to the related description of the downlink audio signal. Details are not described herein. The reference audio signal sequence may be the same as the downlink audio signal sequence described above.

The reference feedback signal sequence includes a plurality of frames of reference feedback signals, and the frame of reference feedback signal is a feedback signal corresponding to the reference audio signal. For a process of obtaining the reference feedback signal by using the reference audio signal, refer to the foregoing description of obtaining the downlink feedback signal by using the downlink audio signal. Details are not described herein.

The silent reference prediction signal sequence includes X frames of silent reference prediction signals, and the frame of silent reference prediction signal is a filtered reference feedback signal (which may be referred to as a reference prediction signal below) that meets a first condition. The first condition is that an admittance value corresponding to the filtered reference feedback signal is less than or equal to a first admittance threshold, and the first admittance threshold usually may be approximately 0.12, which indicates that the silent reference prediction signal carries very little voice information or no voice information. In some cases, the silent reference prediction signal may carry only information about a pilot signal.

A reference admittance value corresponding to a sample of the screen sound generator may be used to represent a range of an admittance value of the sample existing when a silent audio signal passes through the sample of the screen sound generator under the normal condition.

For a process of determining the normal admittance value range by the terminal, refer to the following description of step S301 to step S304.

S301: The terminal obtains a reference admittance value of a first sample corresponding to the screen sound generator under the normal condition.

The first sample is a normal screen sound generator.

The reference admittance value of the first sample may be used to represent a range of an admittance value existing when a silent audio signal passes through the sample under the normal condition.

Figure 8:
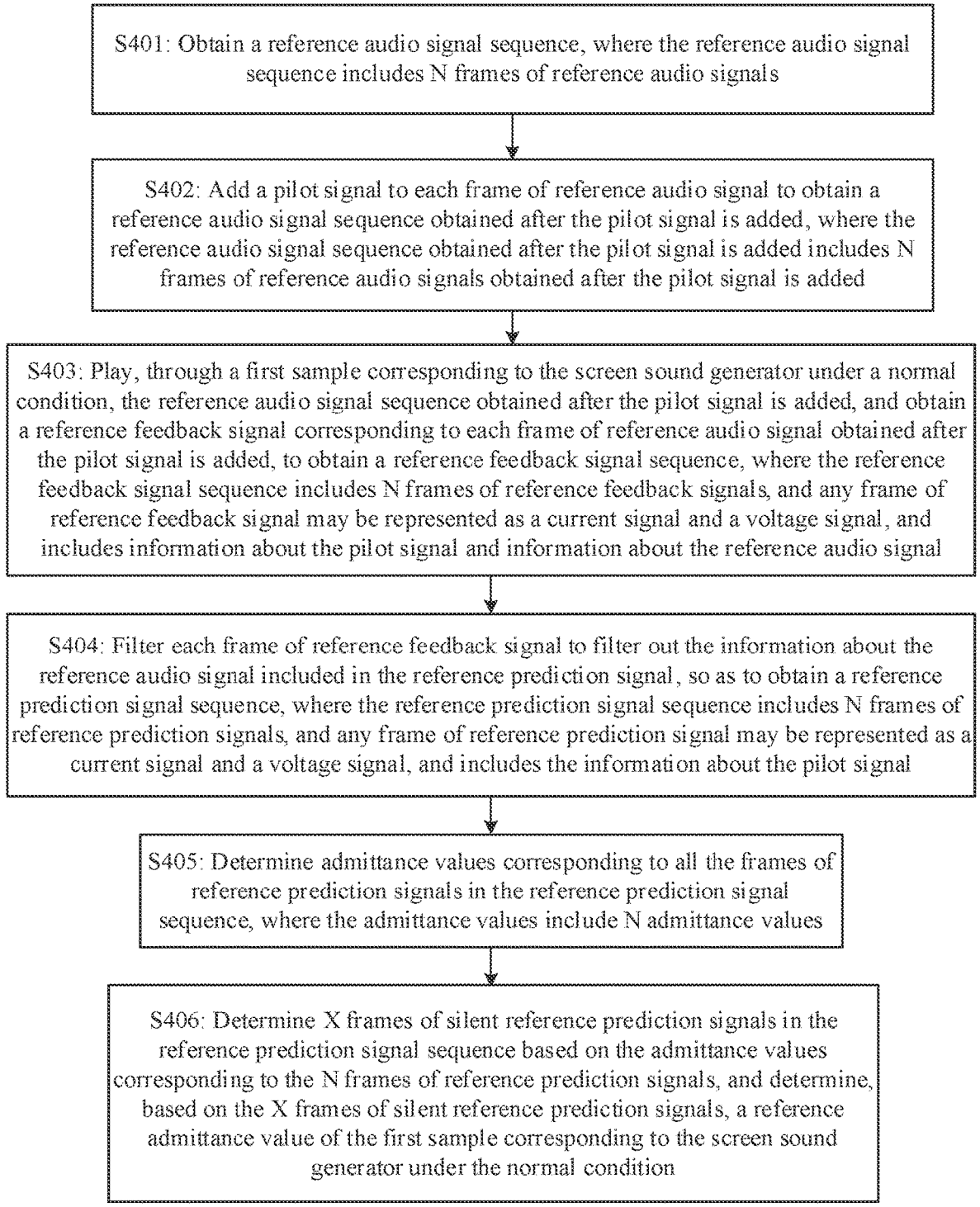
FIG. 8 is a schematic flowchart of obtaining, by a terminal, a reference admittance value corresponding to a first sample of a screen sound generator.

FIG. 8 is a schematic flowchart of obtaining, by the terminal, the reference admittance value corresponding to the first sample of the screen sound generator.

For a process of obtaining the reference admittance value of the first sample by the terminal, refer to the following description of step S401 to step S406.

S401: The terminal obtains a reference audio signal sequence, where the reference audio signal sequence includes N frames of reference audio signals.

The frame of reference audio signal is an audio signal used in the process of determining the normal admittance value range by the terminal.

The terminal may obtain the reference audio signal sequence in a process of communicating with another terminal by using a call application. This process is the same as the process of obtaining the downlink audio signal sequence by the terminal in step S102. Reference may be made to the related description of step S102. Details are not described herein.

S402: The terminal adds a pilot signal to each frame of reference audio signal to obtain a reference audio signal sequence obtained after the pilot signal is added, where the reference audio signal sequence obtained after the pilot signal is added includes N frames of reference audio signals obtained after the pilot signal is added.

Step S402 is the same as step S103. Reference may be made to the description of step S103. Details are not described herein.

S403: The terminal plays, through the first sample corresponding to the screen sound generator under the normal condition, the reference audio signal sequence obtained after the pilot signal is added, and obtains a reference feedback signal corresponding to each frame of reference audio signal obtained after the pilot signal is added, to obtain a reference feedback signal sequence, where the reference feedback signal sequence includes N frames of reference feedback signals, and any frame of reference feedback signal may be represented as a current signal and a voltage signal, and includes information about the pilot signal and information about the reference audio signal.

Step S403 is the same as step S104. Reference may be made to the description of step S104. Details are not described herein.

S404: The terminal filters each frame of reference feedback signal to filter out the information about the reference audio signal included in the reference feedback signal, so as to obtain a reference prediction signal sequence, where the reference prediction signal sequence includes N frames of reference prediction signals, and any frame of reference prediction signal may be represented as a current signal and a voltage signal, and includes the information about the pilot signal.

The reference prediction signal sequence includes N frames of reference prediction signals, and the frame of reference prediction signal is a filtered reference feedback signal.

The reference feedback signal is filtered to filter out information about an audio signal other than the pilot signal in the reference feedback signal, to obtain the reference prediction signal, so that the reference prediction signal includes the only information about the pilot signal. In this way, the reference prediction signal may not carry voice information, and therefore has low energy, and can be used as a silent reference prediction signal to determine the reference admittance value of the first sample corresponding to the screen sound generator under the normal condition. However, in actual application, the reference prediction signal still includes some other information (for example, some information about the downlink audio signal) in addition to the information about the pilot signal. Consequently, energy of the reference prediction signal is relatively high, and a harmonic is easily generated, which affects determining of the admittance value of the screen sound generator and is not suitable for calculating the reference admittance value. In this case, an admittance value corresponding to the reference prediction signal may be calculated in the following step S406, and whether the reference prediction signal is a silent reference prediction signal may be determined based on the admittance value corresponding to the reference prediction signal. For detailed description of this process, refer to the following related description of step S406.

The process of filtering the reference feedback signal to obtain the reference prediction signal sequence is similar to the related content in step S105. Reference may be made to the description of step S105. Details are not described herein.

S405: The terminal determines admittance values corresponding to all the frames of reference prediction signals in the reference prediction signal sequence, where the admittance values include N admittance values.

Step S405 is similar to step S106. Reference may be made to the description of step S106. Details are not described herein.

S406: The terminal determines X frames of silent reference prediction signals in the reference prediction signal sequence based on the admittance values corresponding to the N frames of reference prediction signals, and determines, based on the X frames of silent reference prediction signals, the reference admittance value of the first sample corresponding to the screen sound generator under the normal condition.

It should be understood that the reference prediction signal sequence may include the X frames of silent reference prediction signals and Y frames of non-silent reference prediction signals.

The frame of silent reference prediction signal is a filtered reference feedback signal (reference prediction signal) that meets a first condition. The first condition is that an admittance value corresponding to the reference prediction signal is less than or equal to a first admittance threshold, and the first admittance threshold usually may be approximately 0.12, which indicates that the silent reference prediction signal carries very little voice information or no voice information.

The frame of non-silent reference prediction signal is a filtered reference feedback signal (reference prediction signal) that meets a second condition. The second condition is that an admittance value corresponding to the reference prediction signal is greater than or equal to a second admittance threshold, and the second admittance threshold is greater than the first admittance threshold described above, which indicates that the non-silent reference prediction signal carries more voice information than the silent reference prediction signal.

Figure 9:
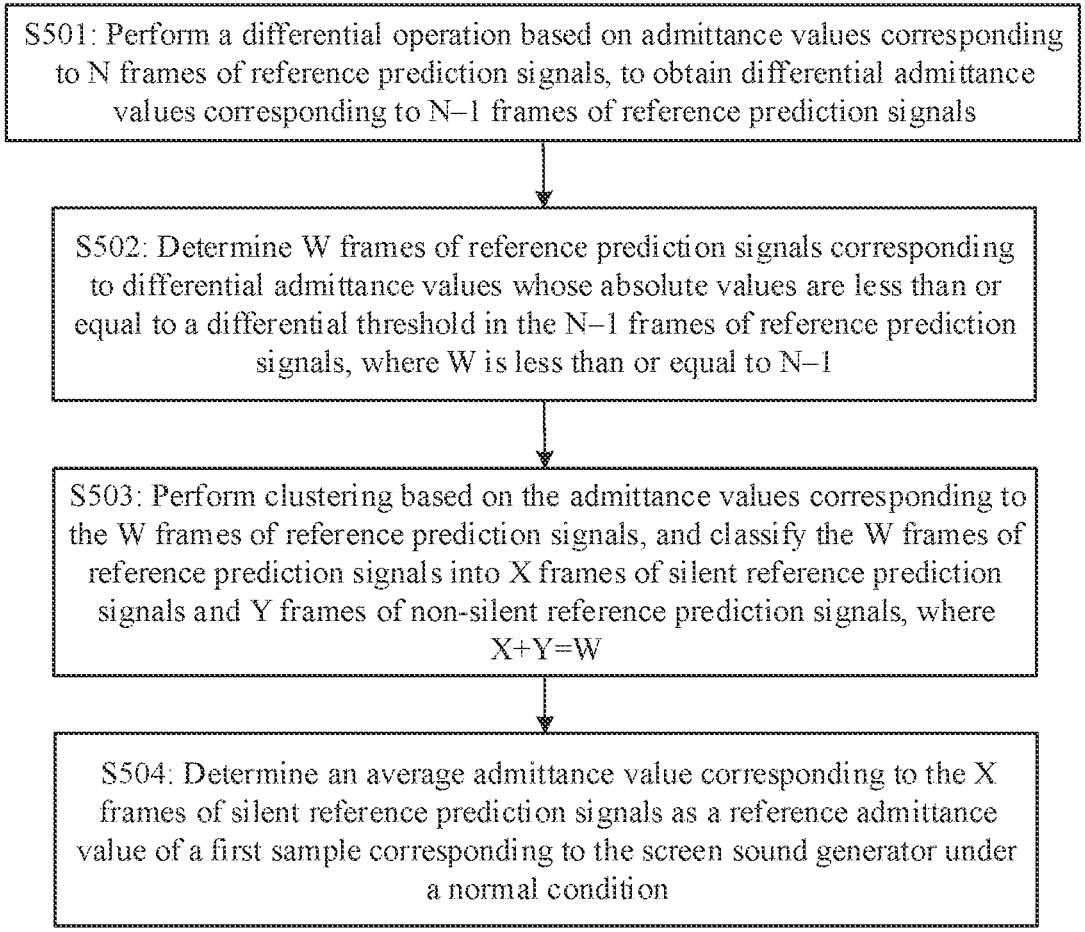
FIG. 9 is a schematic flowchart of determining, by a terminal, a reference admittance value of a first sample corresponding to the screen sound generator under a normal condition based on admittance values corresponding to N frames of reference prediction signals.

Therefore, the terminal may determine the X frames of silent reference prediction signals in the reference prediction signal sequence based on the admittance values corresponding to the N frames of reference prediction signals, and then determine, based on the X frames of silent reference prediction signals, the reference admittance value of the first sample corresponding to the screen sound generator under the normal condition. FIG. 9 is a schematic flowchart in this process.

As shown in FIG. 9, step S501 and step S502 are performed to remove Z frames of prediction audio signals whose admittance value changes are greater than an admittance value change threshold from the N frames of reference prediction signals and to retain a silent reference prediction signal and a non-silent reference prediction signal (it is assumed that there are a total of W frames of reference prediction signals). Herein, N=W+Z. Step S503 is performed to classify the W frames of reference prediction signals to obtain the X frames of silent reference prediction signals and the Y frames of non-silent reference prediction signals. The reference admittance value of the first sample corresponding to the screen sound generator under the normal condition may be determined based on the X frames of silent reference prediction signals in step S504.

For this process, refer to the following description of step S501 to step S504.

S501: The terminal performs a differential operation based on the admittance values corresponding to the N frames of reference prediction signals, to obtain differential admittance values corresponding to (N−1) frames of reference prediction signals.

That the terminal performs a differential operation on an admittance value corresponding to a frame of reference prediction signal means that the admittance value corresponding to the frame of reference prediction signal is subtracted from an admittance value corresponding to a next frame of reference prediction signal of the frame of reference prediction signal. In this case, a differential admittance value corresponding to the frame of reference prediction signal is a difference between the admittance value corresponding to the next frame of reference prediction signal of the frame of reference prediction signal and the admittance value corresponding to the frame of reference prediction signal. The next frame of reference prediction signal of the frame of reference prediction signal is a reference prediction signal that is separated by one frame in terms of collection time.

A differential admittance value corresponding to an ith frame of reference prediction signal is denoted as diffG$_{Rsignal(i)}$. In this case, for a process of determining the differential admittance value corresponding to the ith frame by the terminal, refer to the following formula (6):

$$diffG_{Rsignal(i)} = G_{Rsignal(i+1)} - G_{Rsignal(i)} \quad \text{formula (6)}$$

In the formula (6), diffG$_{Rsignal(i)}$ is the differential admittance value corresponding to the ith frame of reference prediction signal, G$_{Rsignal(i+1)}$ is a next frame of reference prediction signal of the ith frame of reference prediction signal, and G$_{Rsignal(i)}$ is the ith frame of reference prediction signal.

The differential admittance value corresponding to the frame of reference prediction signal may reflect an admittance value change corresponding to the frame of reference prediction signal. When the differential admittance value corresponding to the frame of reference prediction signal is greater than or equal to the admittance value change threshold, the frame of reference prediction signal is not suitable for participating in obtaining the silent reference prediction signal due to a corresponding excessively large admittance value change, and reduces accuracy of a calculation result. Therefore, in the following step S502, filtering is performed based on the differential admittance value of each frame of reference prediction signal, and the W frames of reference prediction signals with a relatively small admittance value change are determined to obtain the silent reference prediction signal. For details about this process, refer to the following description of step S502.

S502: The terminal determines the W frames of reference prediction signals corresponding to differential admittance values whose absolute values are less than or equal to a differential threshold in the N−1 frames of reference prediction signals, where W is less than or equal to N−1.

Figure 10:
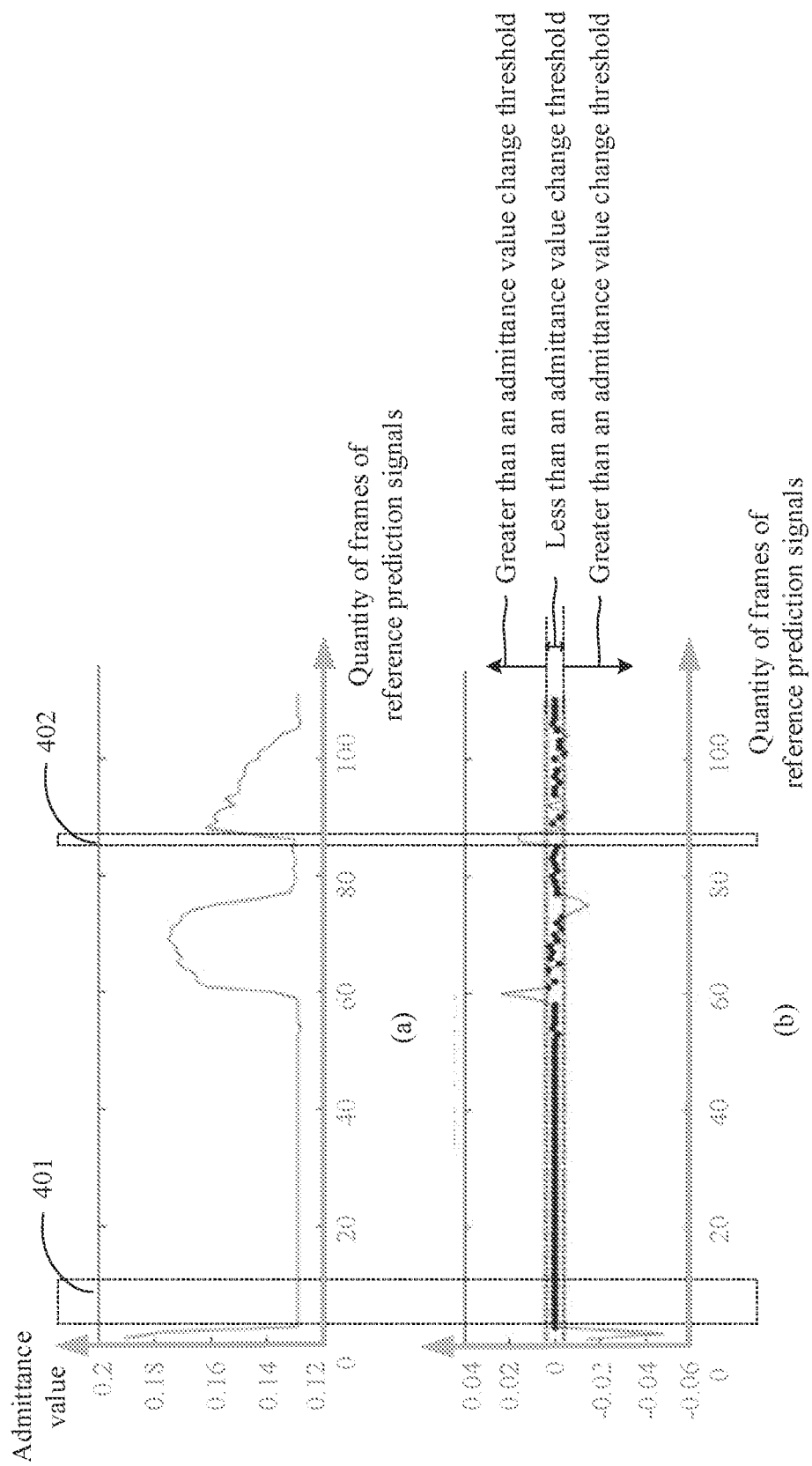
FIG. 10 is a schematic diagram of performing a differential operation on a reference prediction signal to obtain a differential admittance value.

FIG. 10 is a schematic diagram of performing a differential operation on a reference prediction signal to obtain a differential admittance value.

A correspondence between a reference prediction signal sequence and an admittance value is shown in (a) in FIG. 10. A correspondence between the reference prediction signal sequence and a differential admittance value is shown in (b) in FIG. 10.

As shown in FIG. 10, a reference prediction signal included in a region 401 corresponds to a relatively stable admittance value change, and therefore a differential admittance value corresponding to the reference prediction signal is less than the admittance value change threshold; and an admittance value change corresponding to a reference prediction signal included in a region 402 fluctuates greatly, and therefore a differential admittance value corresponding to the reference prediction signal is greater than the admittance value change threshold.

The terminal determines the W frames of reference prediction signals corresponding to the differential admittance values whose absolute values are less than or equal to the differential threshold in the N−1 frames of reference prediction signals, where W is less than or equal to N−1.

Classification may be performed based on the W frames of reference prediction signals with a relatively stable admittance value change. For a process of classifying the W frames of reference prediction signals into a silent reference prediction signal and a non-silent reference prediction signal, refer to the following related description of step S503.

S503: Perform clustering based on the admittance values corresponding to the W frames of reference prediction signals, and classify the W frames of reference prediction signals into the X frames of silent reference prediction signals and the Y frames of the non-silent reference prediction signals, where X+Y=W.

It may be learned, based on the foregoing content, that an admittance value corresponding to the silent reference prediction signal is less than or equal to the first admittance threshold, and an admittance value of the non-silent reference prediction signal is greater than or equal to the second admittance threshold. The first admittance threshold is less than or equal to the second admittance threshold. When the first admittance threshold is equal to the second admittance threshold, the terminal may determine that a reference prediction signal whose admittance value is less than the first admittance threshold is a silent reference prediction signal, and a reference prediction signal whose admittance value is greater than the first admittance threshold is a non-silent reference prediction signal.

Initial values of the first admittance threshold and the second admittance threshold are preset. For example, the initial value of the first admittance threshold may be set to 0.12, and the initial value of the second admittance threshold may be set to 0.15. The initial values may be set based on an actual situation. This is not limited in this embodiment of this application.

The terminal may cluster the W frames of reference prediction signals based on the first admittance threshold and the second admittance threshold, use the first admittance threshold as an initial clustering center of the silent reference prediction signal, and use the second admittance threshold as an initial clustering center of the non-silent reference prediction signal, to obtain a first clustering result: The W frames of reference prediction signals are classified into two categories: a silent reference prediction signal sequence and a non-silent reference prediction signal sequence. Then, the first admittance threshold and the second admittance value are updated based on the first clustering result, to obtain an updated first admittance threshold and an updated second admittance value. The W frames of reference prediction signals are clustered again based on the updated first admittance threshold and the updated second admittance value, and so on. After clustering is performed for a plurality of times, when a difference between the updated first admittance threshold and the updated second admittance value obtained after clustering is performed for Q consecutive times is less than a preset threshold, the terminal may end clustering, use a current clustering result as a final clustering result, and classify the W frames of reference prediction signals into the X frames of silent reference prediction signals and the Y frames of non-silent reference prediction signals, where X+Y=W. For example, the terminal may cluster the W frames of reference prediction signals based on the first admittance threshold and the second admittance value by using a clustering algorithm (K-means clustering algorithm, mean shift clustering algorithm, or the like), and classify the W frames of reference prediction signals into the X frames of silent reference prediction signals and the Y frames of non-silent reference prediction signals.

S504: The terminal determines an average admittance value corresponding to the X frames of silent reference prediction signals as the reference admittance value of the first sample corresponding to the screen sound generator under the normal condition.

The average admittance value corresponding to the X frames of silent reference prediction signals is an average value of admittance values corresponding to the X frames of silent reference prediction signals.

An ith frame of silent reference prediction signal is denoted as $G_{SRsignal(i)}$. Herein, $i=\{i\in N+1\leq i\leq X\}$. In this case, for a related formula for determining, by the terminal, the reference admittance value of the first sample corresponding to the screen sound generator under the normal condition, refer to the following formula (7):

$$fG_{normal}(1) = \frac{\sum_{i=1}^{X} G_{SRsignal(i)}}{X} \quad \text{formula (7)}$$

In the formula (7), $fG_{normal}(1)$ represents the reference admittance value of the first sample corresponding to the screen sound generator under the normal condition. Herein, $G_{SRsignal(i)}$ represents the ith frame of silent reference prediction signal.

S302: The terminal obtains a reference admittance value of a second sample corresponding to the screen sound generator under the normal condition.

The second sample is another normal screen sound generator.

The reference admittance value of the second sample may be used to represent a range of an admittance value existing when a silent audio signal passes through the sample under the normal condition.

Step S302 is similar to step S301. Reference may be made to the description of step S301. Details are not described herein.

S303: The terminal obtains a reference admittance value of an Mth sample corresponding to the screen sound generator under the normal condition.

The Mth sample is another normal screen sound generator.

The reference admittance value of the Mth sample may be used to represent a range of an admittance value existing when a silent audio signal passes through the sample under the normal condition.

Step S303 is similar to step S301. Reference may be made to the description of step S301. Details are not described herein.

S304: The terminal determines a normal admittance value range of the screen sound generator under the normal condition based on reference admittance values of M samples corresponding to the screen sound generator under the normal condition.

In some embodiments, the terminal may select a largest reference admittance value and a smallest reference admittance value from reference admittance values corresponding to different samples, and use a range from the smallest reference admittance value to the largest reference admittance value as the normal admittance value range.

The reference admittance values corresponding to the different samples are denoted as $fG_{normal}(i)$. Herein, $i=\{i\in N+1\leq i\leq M\}$, and $fG_{normal}(i)$ represents a reference admittance value of an ith sample corresponding to the screen sound generator under the normal condition.

The normal admittance value range is denoted as $[fG_{low}, fG_{high}]$. Herein, $fG_{low}=\min\{fG_{normal}(i)\}$, $fG_{high}=\max\{fG_{normal}(i)\}$, and $i=\{i\in N+1\leq i\leq M\}$.

In some other embodiments, the terminal may select a largest reference admittance value and a smallest reference admittance value from reference admittance values corresponding to different samples, and use a range from a value obtained by subtracting a robust control factor from the smallest reference admittance value to a value obtained by adding the robust control factor to the largest reference admittance value as the normal admittance value range. The robust control factor may enable the normal admittance value range to be capable of resisting fluctuation, to avoid instability of the normal admittance value range.

The normal admittance value range may be expressed as $[fG_{low}, fG_{high}]$, where $fG_{low}=\min\{fG_{normal}(i)\}-\Delta\theta$, $fG_{high}=\max\{fG_{normal}(i)\}+\Delta\theta$, and $i=\{i\in N+1\leq i\leq M\}$. Herein, $\Delta\theta$ represents the robust control factor of the normal admittance value range.

Figure 11:
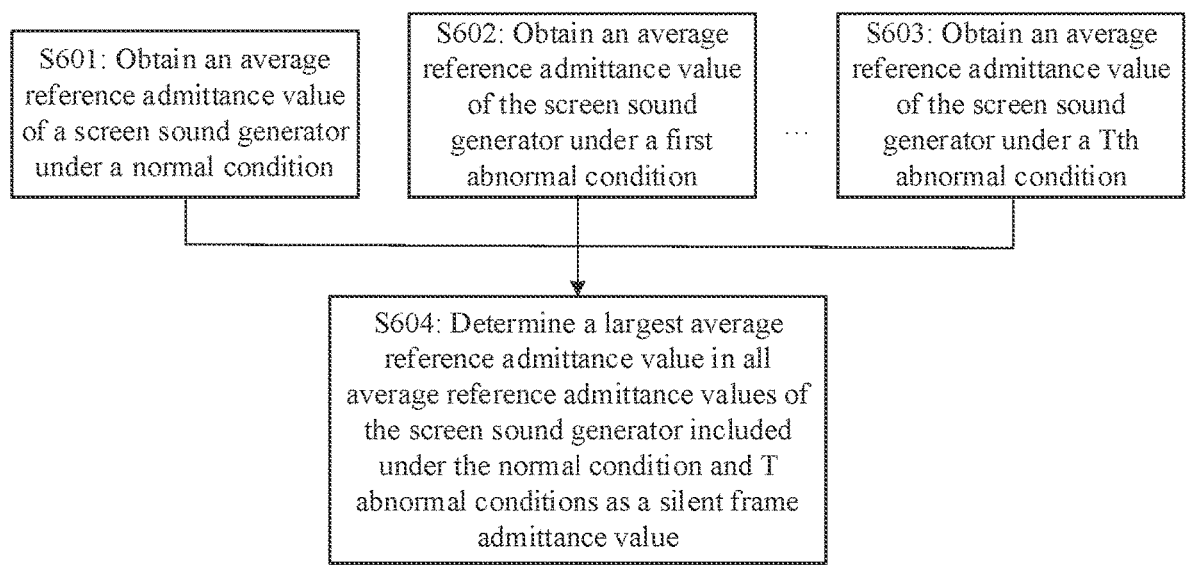
FIG. 11 is a schematic flowchart of determining a silent frame admittance value by a terminal.

FIG. 11 is a schematic flowchart of determining a silent frame admittance value by a terminal.

The silent frame admittance value is a maximum admittance value of the screen sound generator existing when the screen sound generator plays the silent audio signal. The silent frame admittance value may be used to describe a maximum admittance value corresponding to a feedback signal (detection signal) generated by using a silent audio signal in a target audio signal when the screen sound generator plays the target audio signal regardless of whether the screen sound generator is normal. That is, when an admittance value corresponding to a feedback signal corresponding to (generated by using) a frame of audio signal is greater than the silent frame admittance value, it indicates that the frame of audio signal is not a silent audio signal. The feedback signal corresponding to the silent audio signal may be interpreted as the detection signal described above.

In a possible implementation, the terminal determines the silent frame admittance value in the following manner: The terminal performs testing by using a plurality of samples of the screen sound generator under different conditions, and respectively determines reference admittance values corresponding to the different samples under the different conditions. For the different conditions, the terminal determines an average reference admittance value of the different samples under a condition as an average reference admittance value of the screen sound generator under this condition. Then, the terminal may select a largest average admittance value from the admittance values of the screen sound generator under the different conditions as the silent frame admittance value.

The different conditions include a normal condition and a plurality of abnormal conditions (for example, an open circuit and a short circuit occur in the screen sound generator). The average reference admittance value may be an average value of reference admittance values corresponding to the different samples under this condition. Like a reference admittance value of a sample under the normal condition, reference admittance values of the sample under the different conditions may reflect a range of an admittance value of the sample existing when a silent audio signal passes through the sample of the screen sound generator under this condition. In this case, an average reference admittance value of a plurality of samples under a condition may represent an average capability level of the screen sound generator to allow a silent audio signal to pass under this condition.

For a process of determining the silent frame admittance value by the terminal, refer to the following description of step S601 to step S604.

S601: Obtain an average reference admittance value of the screen sound generator under the normal condition.

The terminal first determines reference admittance values of a plurality of samples of the screen sound generator under the normal condition. For a process of determining a reference admittance value of one of the samples under the normal condition by the terminal, refer to the related description of step S301. Details are not described herein.

The terminal then determines an average value of the reference admittance values of the plurality of samples under the normal condition as the average reference admittance value of the screen sound generator under the normal condition.

S602: Obtain an average reference admittance value of the screen sound generator under a first abnormal condition.

The first abnormal condition is a condition under which the screen sound generator is damaged. For example, the first abnormal condition may be a condition under which a short circuit occurs in the screen sound generator.

The terminal first determines reference admittance values of a plurality of samples of the screen sound generator under the first abnormal condition. A reference admittance value of one of the samples under the first abnormal condition may be used to represent a range of an admittance value existing when a silent audio signal passes through the sample under the first abnormal condition.

For a process of determining the reference admittance value of one of the samples under the first abnormal condition by the terminal, refer to the related description of step S301. Details are not described herein.

The terminal then determines an average value of the reference admittance values of the plurality of samples under the first abnormal condition as the average reference admittance value of the screen sound generator under the first abnormal condition.

S603: Obtain an average reference admittance value of the screen sound generator under a Tth abnormal condition.

The first abnormal condition is another condition under which the screen sound generator is damaged. For example, the first abnormal condition may be that an open circuit occurs in the screen sound generator.

The terminal first determines reference admittance values of a plurality of samples of the screen sound generator under a second abnormal condition. A reference admittance value of one of the samples under the second abnormal condition may be used to represent a range of an admittance value existing when a silent audio signal passes through the sample under the second abnormal condition.

For a process of determining the reference admittance value of one of the samples under the second abnormal condition by the terminal, refer to the related description of step S301. Details are not described herein.

The terminal then determines an average value of the reference admittance values of the plurality of samples under the second abnormal condition as an average reference admittance value of the screen sound generator under the second abnormal condition.

S604: The terminal determines a largest average reference admittance value in all average reference admittance values of the screen sound generator included under the normal condition and T abnormal conditions as the silent frame admittance value.

In some embodiments, the terminal may select the largest average reference admittance value as the silent frame admittance value from all the average reference admittance values of the screen sound generator included under the different conditions (the normal condition and the T abnormal conditions).

All the average reference admittance values of the screen sound generator included under the different conditions are denoted as $fG_{condition}(i)$. Herein, $i=\{i\in N+|1\leq i\leq T+1\}$, and $fG_{condition}(i)$ represents an average reference admittance value of the screen sound generator under an ith condition.

The silent frame admittance value is denoted as $fG_{silent}$. Herein, $fG_{silent}=\max\{fG_{condition}(i)\}$, and $i=\{i\in N+|1\leq i\leq T+1\}$.

In some other embodiments, the terminal may select the largest average reference admittance value from all the average reference admittance values of the screen sound generator included under the different conditions (the normal condition and the T abnormal conditions), and use a value obtained by adding a robust control factor to the largest average reference admittance value as the silent frame admittance value.

The silent frame admittance value is denoted as $fG_{silent}$. Herein, $fG_{silent}=\max\{fG_{condition}(i)\}+\delta$, $i=\{i\in N+|1\leq i\leq T+1\}$, and $\delta$ is the robust control factor of the silent frame admittance value. The robust control factor may enable the silent frame admittance value to be capable of resisting fluctuation, to avoid instability of the silent frame admittance value.

It should be understood that in the process of determining the silent frame admittance value, capabilities of the screen sound generator to allow the silent audio signal to pass under the different conditions are tested, and then the largest average reference admittance value is selected as the silent frame admittance value. Therefore, each condition contributes to the silent frame admittance value, and the silent frame admittance value may describe a capability of the screen sound generator to allow the silent audio signal to pass regardless of whether the screen sound generator is normal.

It should be understood that in the process of determining the normal admittance value range, the reference audio signal sequence separately played by the terminal through the different samples of the screen sound generator under the normal condition may be a silent audio signal sequence or a pilot signal sequence, and then a reference feedback signal sequence corresponding to the silent audio signal sequence or the pilot signal sequence may be obtained. The terminal may not perform an operation such as filtering on the reference feedback signal sequence to determine a silent reference prediction signal sequence, but use the feedback signal sequence as a silent reference prediction signal sequence, calculate an average admittance value corresponding to the feedback signal sequence, use the average admittance value as the reference admittance value existing when the sample of the screen sound generator plays the silent audio signal, and then determine the normal admittance value range. In other words, this process may not include the operation of filtering the reference feedback signal sequence to obtain a silent reference prediction signal sequence.

In the process of determining the silent frame admittance value, the reference audio signal sequence separately played by the terminal through the different samples of the screen sound generator under the different conditions may be a silent audio signal sequence or a pilot signal sequence, and then a reference feedback signal sequence corresponding to the silent audio signal sequence or the pilot signal sequence may be obtained. The terminal may not perform an operation such as filtering on the feedback signal sequence to determine a silent reference prediction signal sequence, but use the feedback signal sequence as a silent reference prediction signal sequence, calculate an average admittance value corresponding to the feedback signal sequence, then determine the average reference admittance values of the screen sound generator under the different conditions, and then determine the silent frame admittance value. In other words, this process may not include the operation of filtering the reference feedback signal sequence to obtain a silent reference prediction signal sequence.

A use scenario of the device detection method in the embodiments of this application is described below.

Use scenario 1: In a process of communicating with another terminal by using a call application, namely, in a call process of a user, a terminal may determine, by using the device detection method in the embodiments of this application, whether a screen sound generator is damaged.

In a possible case, after starting the call application, the terminal may trigger detection of the screen sound generator, and obtain an audio signal for a time period (for example, is) to obtain a downlink audio signal sequence. In the call process of the user, the terminal may determine, based on the downlink audio signal sequence, whether the screen sound generator is normal. For this process, refer to the description of the foregoing related content.

When determining that the screen sound generator is damaged, the terminal may not play an audio signal through the screen sound generator, play the audio signal only through an earpiece, and increase energy of the audio signal played by the earpiece, so that the user can clearly hear a sound. In addition, the terminal may display prompt information to notify the user that the screen sound generator is damaged.

Figure 12:
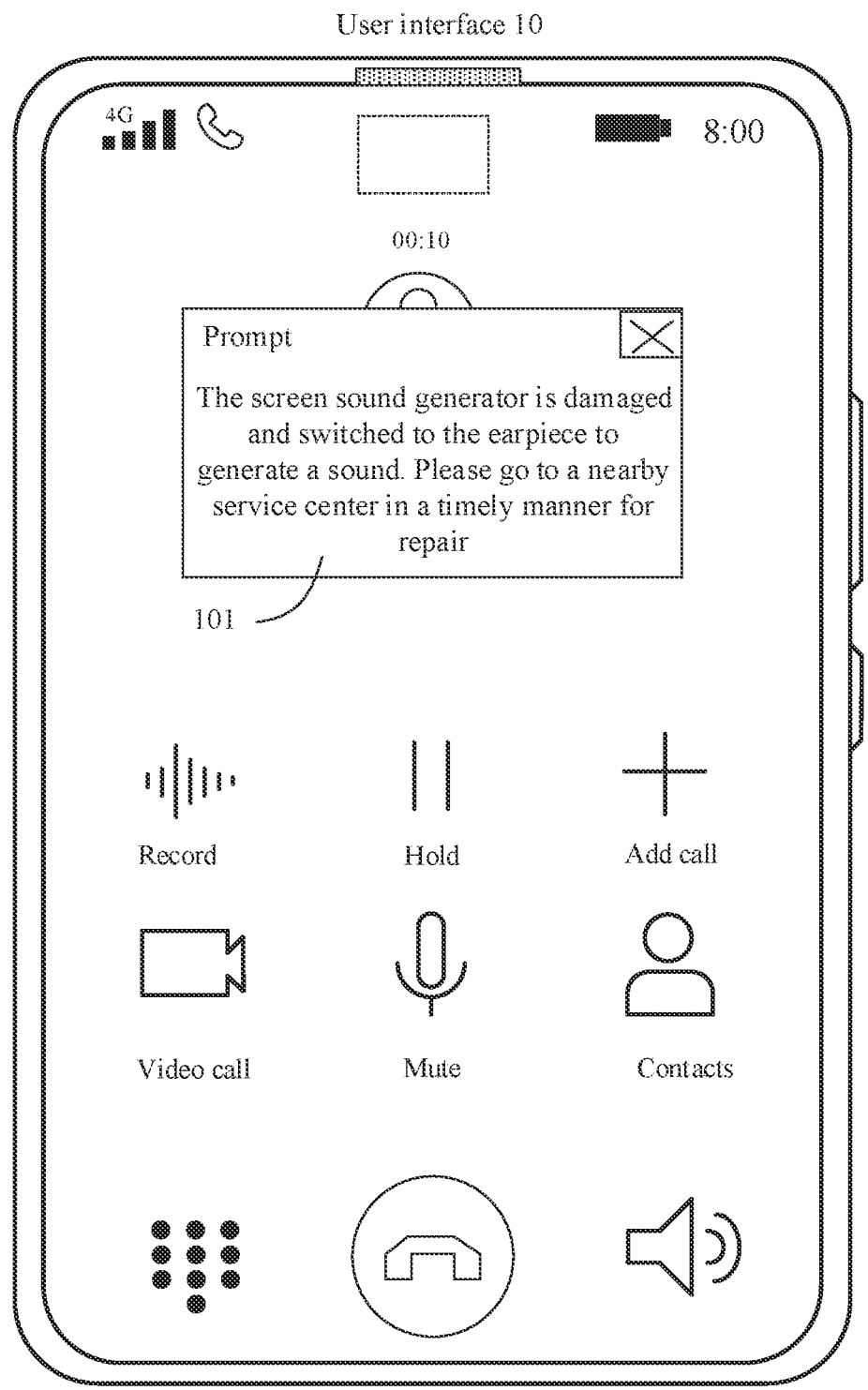
FIG. 12 is an example user interface existing when a terminal displays prompt information to notify a user that a screen sound generator is damaged.

FIG. 12 is an example user interface existing when a terminal displays prompt information to notify a user that a screen sound generator is damaged.

As shown in FIG. 12, a user interface 10 is a user interface existing when the terminal starts the call application. When determining that the screen sound generator is damaged, the terminal may display a prompt box 101 in the user interface 10, and the prompt box 101 may include prompt information "the screen sound generator is damaged and switched to the earpiece to generate a sound. Please go to a nearby service center in a timely manner for repair".

Figure 13:
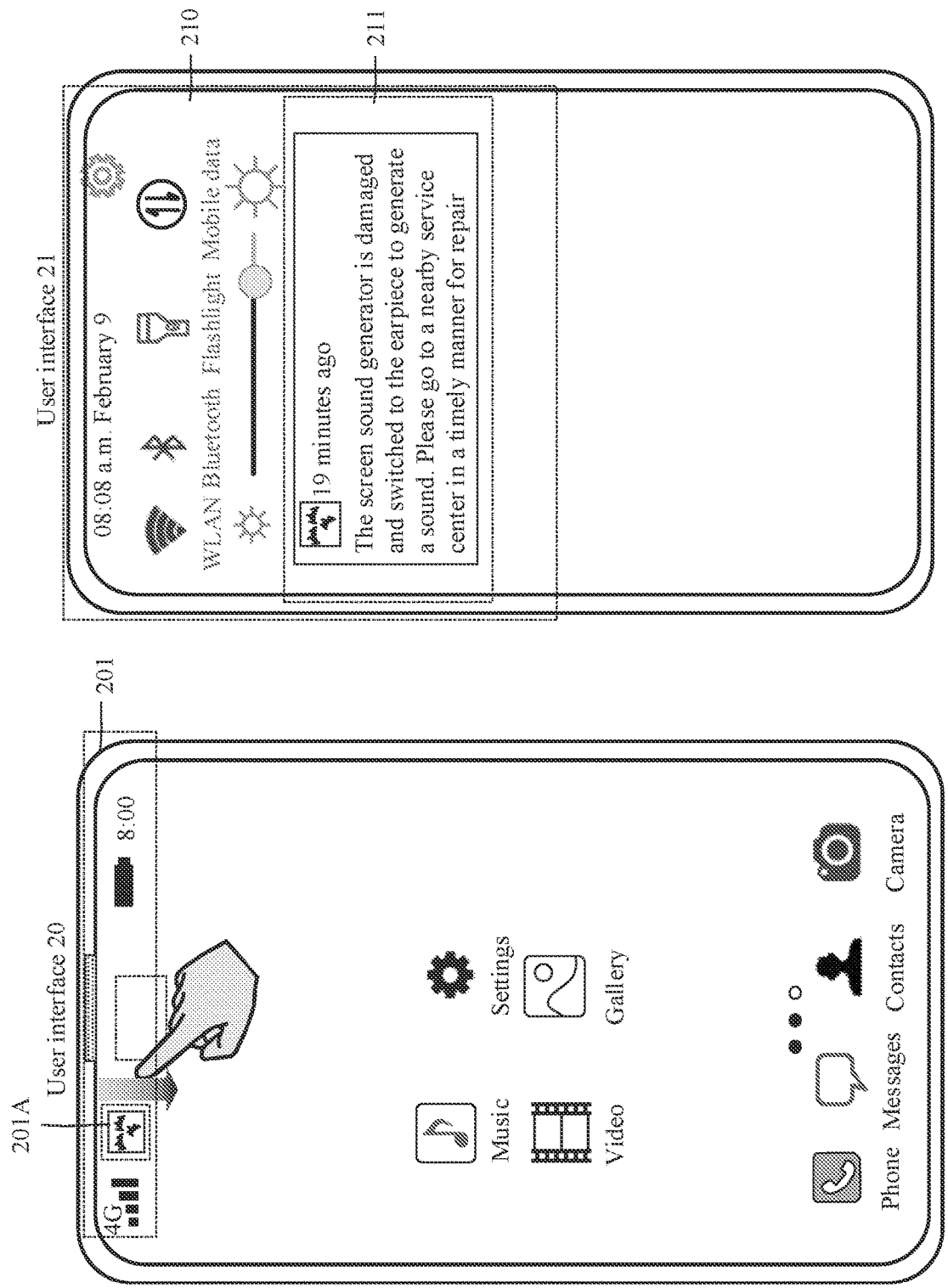
FIG. 13 is another example user interface existing when a terminal displays prompt information to notify a user that a screen sound generator is damaged.

FIG. 13 is another example user interface existing when a terminal displays prompt information to notify a user that a screen sound generator is damaged.

As shown in (a) in FIG. 13, when determining that the screen sound generator is damaged, the terminal may display a user interface 20. The user interface 20 may include a status bar 201, the status bar 201 may include a damage notification 201A, and the damage notification 201A may be used to prompt the user that the screen sound generator is damaged.

In response to an operation (for example, a downward sliding operation) performed by the user in the status bar 201, the terminal may display a user interface 21 shown in (b) in FIG. 13.

As shown in (b) in FIG. 13, the user interface 21 is an example user interface existing when the status bar 201 is pulled down to display a notification page, and the user interface 21 may include a notification page 210. The notification page 210 may include details about any notification in the status bar 201. For example, a region 211 may include details about the damage notification 201A, and the region 211 may include prompt information "the screen sound generator is damaged and switched to the earpiece to generate a sound. Please go to a nearby service center in a timely manner for repair". The prompt information may prompt the user that the screen sound generator is damaged.

Use scenario 2: A terminal may set a setting item for detecting a screen sound generator. The setting item may provide a function for detecting the screen sound generator. A user may enable, by using the setting item, the terminal to trigger detection of the screen sound generator. A detection signal sequence in the detection process may be preset in the terminal, or may be obtained in a process of communicating with another terminal by using a call application, and then stored in a memory.

It should be understood that in this use scenario, the terminal may not play, through the screen sound generator, a downlink audio signal sequence that carries voice information, but play the silent audio signal sequence or the pilot signal sequence described above, that is, use the silent audio signal sequence or the pilot signal sequence as the downlink audio signal sequence described above, and then obtain a feedback signal sequence corresponding to the silent audio signal sequence or the pilot signal sequence. The terminal may not perform an operation such as filtering on the feedback signal sequence to determine a detection signal sequence, but use the feedback signal sequence as a detection signal sequence, calculate an average admittance value corresponding to the feedback signal sequence, use the average admittance value as an admittance value existing when the screen sound generator plays a silent audio signal, and then compare the average admittance value corresponding to the feedback signal sequence with a normal admittance value range, to determine whether the screen sound generator is normal.

Figure 14A:
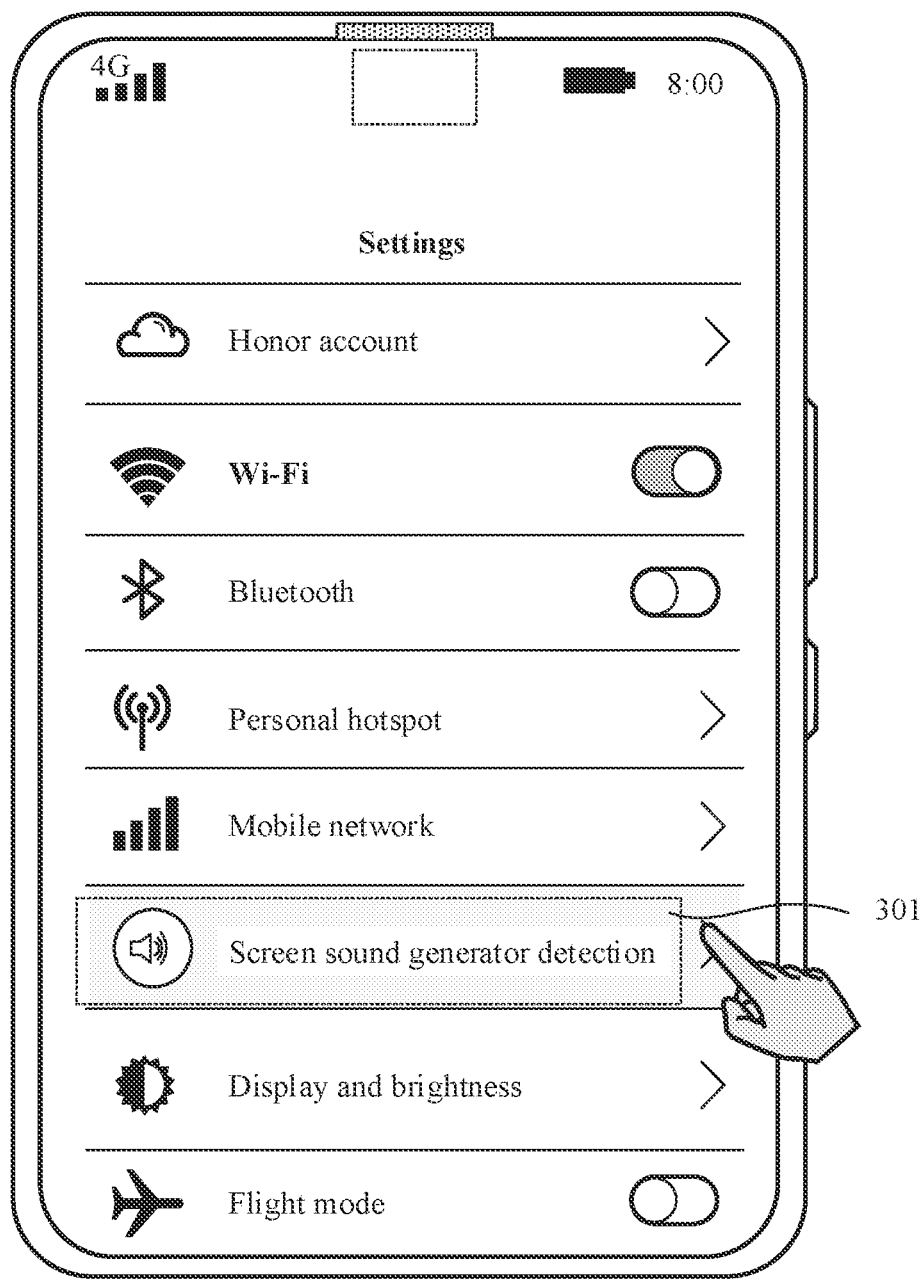
FIG. 14A-FIG. 14C show a group of example user interfaces existing when a user triggers, through a setting item, a terminal to detect a screen sound generator.
Figure 14B:
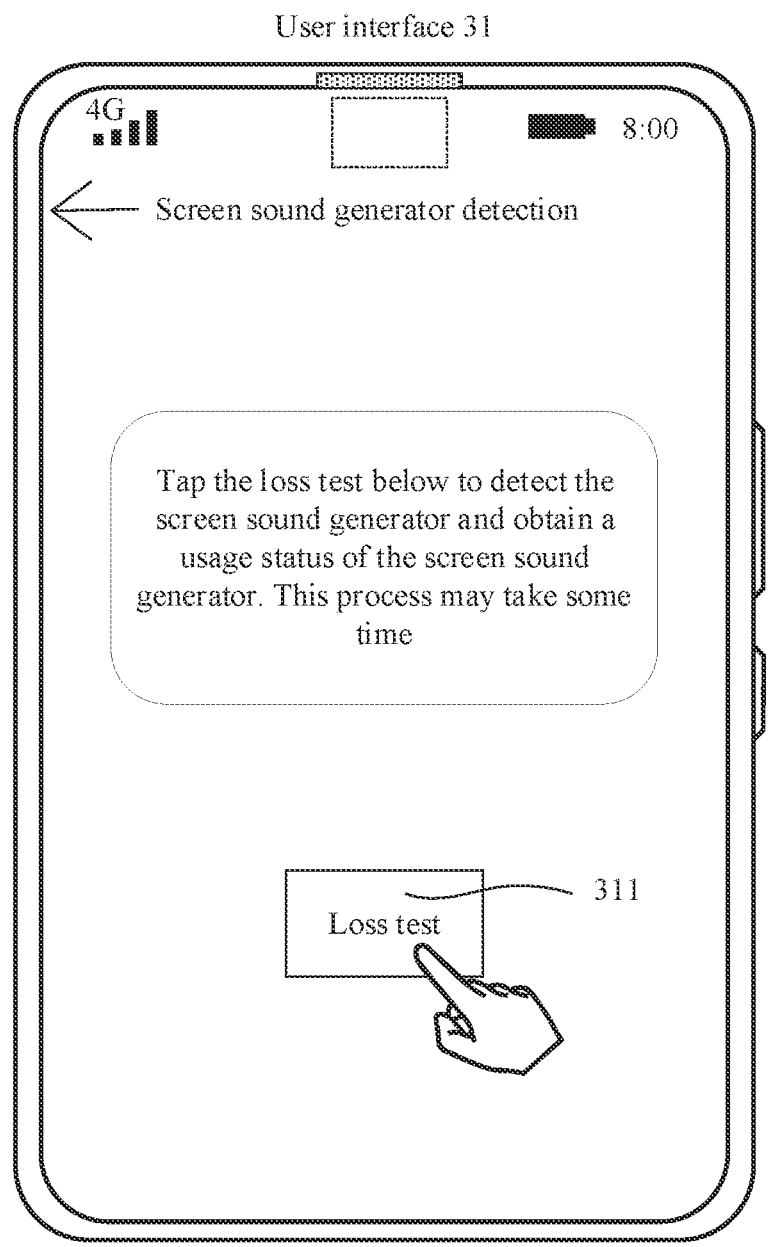
Figure 14C:
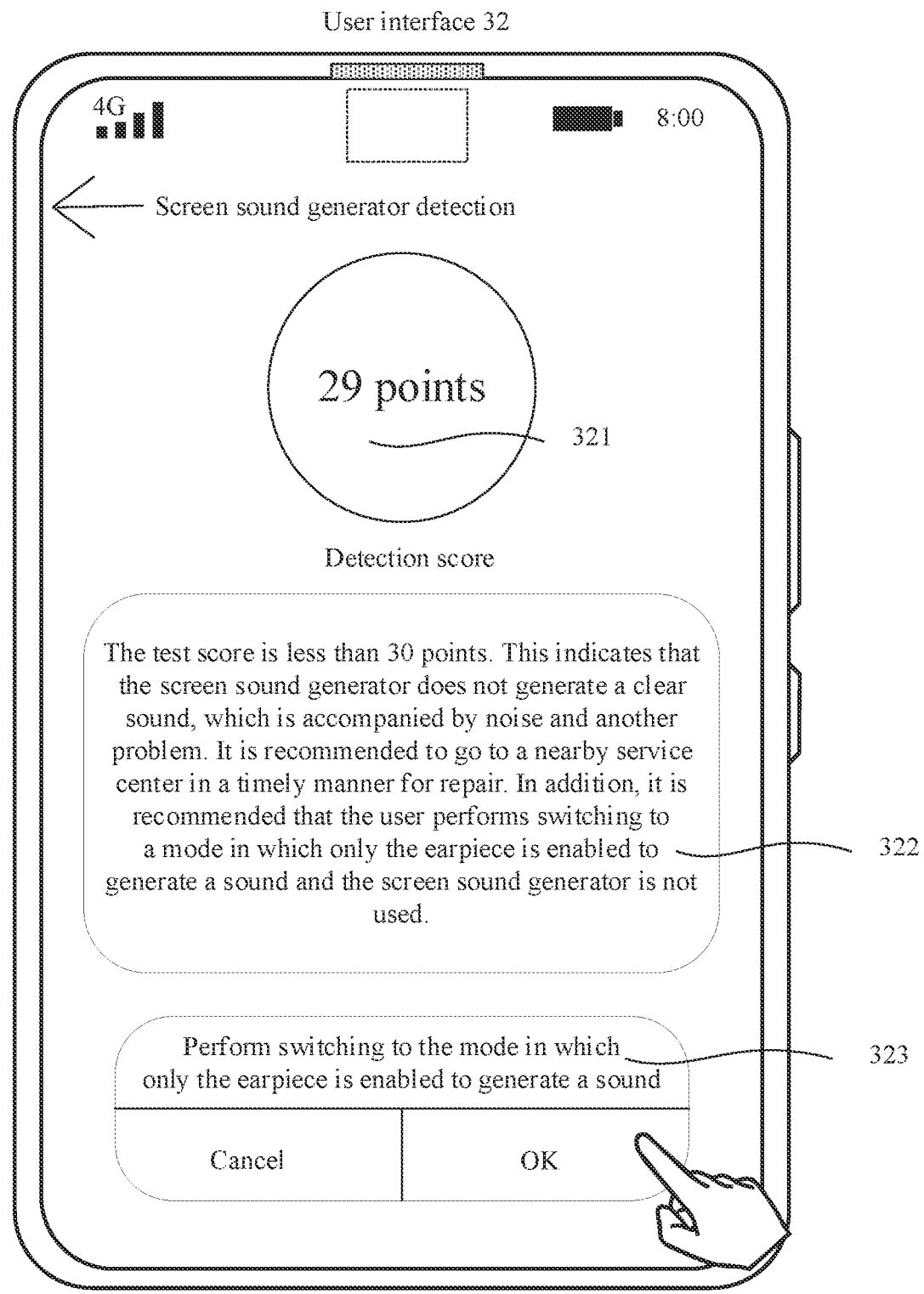

FIG. 14A-FIG. 14C show a group of example user interfaces existing when a user triggers, through a setting item, a terminal to detect a screen sound generator.

As shown in FIG. 14A, a user interface 30 is a setting interface of the terminal. The user interface 30 may include a screen sound generator detection setting item 301. In response to an operation (for example, a tap operation) performed by the user on the screen sound generator detection setting item 301, the terminal may display a user interface 31 shown in FIG. 14B.

As shown in FIG. 14B, the user interface 31 is a user interface corresponding to setting content corresponding to the screen sound generator detection setting item 301. The user interface 31 may include a loss test control 311. The loss test control 311 may be used to trigger the terminal to detect the screen sound generator. In response to an operation (for example, a tap operation) performed by the user on the loss test control 311, the terminal may detect the screen sound generator, and display a detection result in a user interface 32 shown in FIG. 14C.

As shown in FIG. 14C, the user interface 32 is a user interface for the terminal to display the detection result. The user interface 32 may include a detection score 321 and related prompt information 322. The test score is used to represent the result of detecting the screen sound generator by the terminal, and the prompt information 322 may be used to explain the detection result. When the screen sound generator is damaged, the terminal may further display a remedial measure for the user to select, to eliminate impact caused due to damage of the screen sound generator. For example, the user interface 32 may include a prompt box 323 with the remedial measure. The prompt box 323 includes prompt information "switching is performed to enable only the earpiece to generate a sound" for the remedial measure. In response to an operation (for example, a tap operation) performed by the user on an OK control, the terminal may not play an audio signal through the screen sound generator, and play the audio signal only through the earpiece.

The screen sound generator in the embodiments of this application may be referred to as a first sound generator, and an audio signal, for example, a downlink audio signal, played by the screen sound generator may also be referred to as a first audio signal; the earpiece may also be referred to as a second sound generator, and an audio signal played by the earpiece may also be referred to as a second audio signal; the downlink audio signal obtained after the pilot signal is added may also be referred to as a first audio signal obtained after the pilot signal is added; the downlink audio signal sequence may also be referred to as a first audio signal sequence, and the frame of included first audio signal obtained after the pilot signal is added may also be referred to as a third audio signal; the feedback signal sequence corresponding to the downlink audio signal sequence obtained after the pilot signal is added may also be referred to as a first feedback signal sequence; the first frequency threshold may also be referred to as a frequency threshold; the user interface in which prompt information is displayed may also be referred to as a first interface; the frame of detection signal included in the detection signal sequence may also be referred to as a first detection signal; the audio signals, for example, the reference audio signals obtained after the pilot signal is added, played by the M samples of the screen sound generator under the normal condition may also be referred to as a second audio signal sequence; and the reference feedback signal may also be referred to as a second feedback signal sequence.

It should be further understood that in the foregoing content, the terminal determines, by using admittance value-related parameters (for example, the silent frame admittance value and the normal admittance value range), whether the screen sound generator is normal. In another case, the terminal may determine, by using other parameters, for example, current-related parameters, whether the screen sound generator is normal. In the embodiments of this application, the current-related parameters may be referred to as a silent frame current value and a normal current value range. In some other cases, the terminal may determine, by using a combination of an admittance value-related parameter and a current-related parameter, whether the screen sound generator is normal, or may determine, by using another parameter, for example, a resistance-related parameter, whether the screen sound generator is normal. Any parameter may be used provided that the capability of the screen sound generator to allow the audio signal to pass is represented. This is not limited in the embodiments of this application.

The normal current value range is a range of a current value of the screen sound generator existing when the screen sound generator of the terminal plays a silent audio signal and the screen sound generator is normal.

The silent frame current value is a maximum current value of the screen sound generator existing when the screen sound generator plays the silent audio signal.

Manners of determining the silent frame current value and the normal current value range are respectively similar to those of determining the silent frame admittance value and the normal admittance value, except that the formulas (1), (2), and (3) are used in the calculation process of the admittance value, but the formulas (2) and (3) are not used during determining of the normal current value range. The other formulas and the related description of the silent frame admittance value and the normal admittance value range may be used as related description of the normal current value range and the silent frame current value provided that the admittance value is replaced with the current value.

An example terminal provided in an embodiment of this application is described below.

Figure 15:
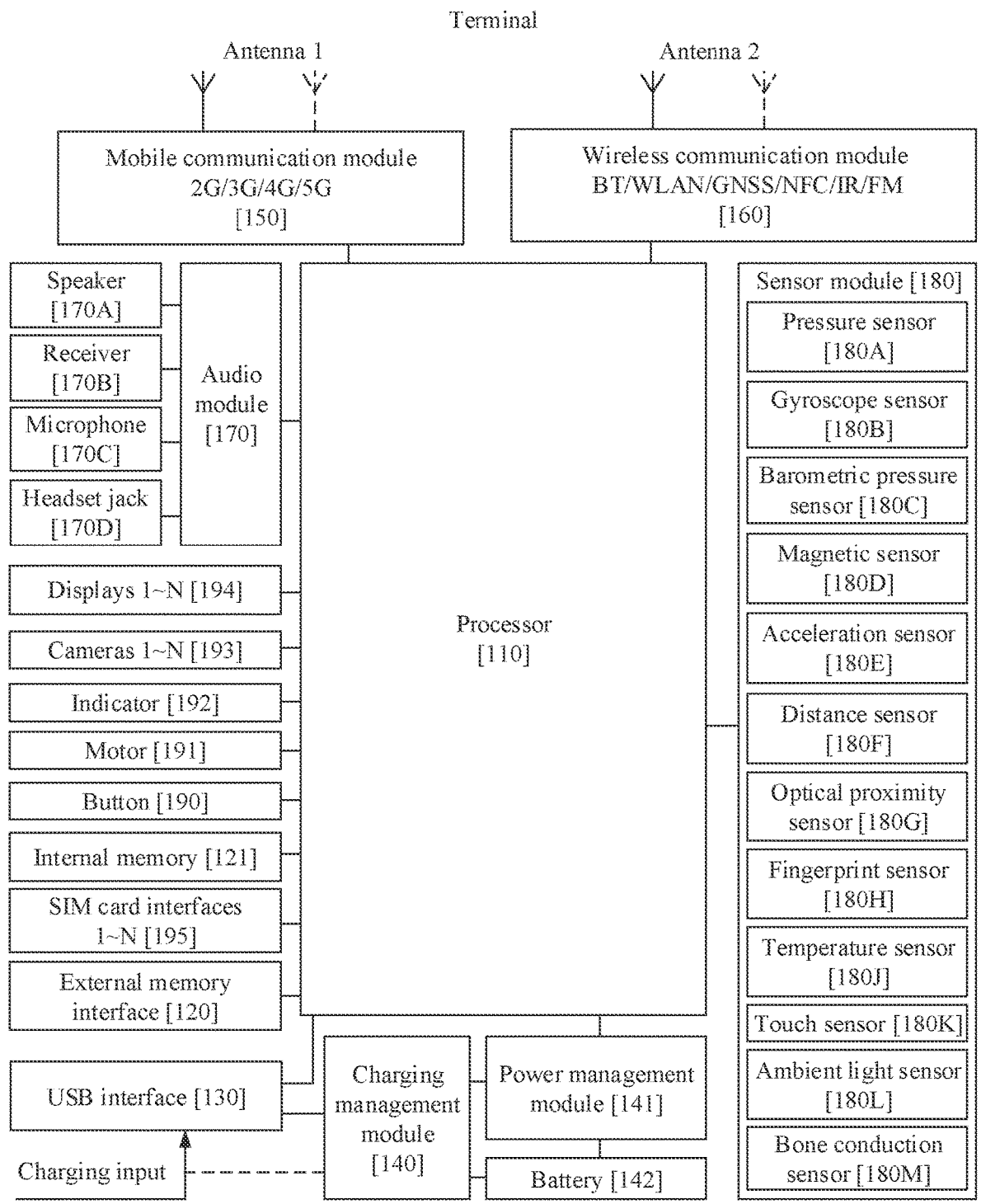
FIG. 15 is a schematic diagram of a structure of a terminal according to an embodiment of this application.

FIG. 15 is a schematic diagram of a structure of a terminal according to an embodiment of this application.

This embodiment is described below in detail by using the terminal as an example. It should be understood that the terminal may have more or fewer components than those shown in the figure, may combine two or more components, or may have different component configurations. Various components shown in the figure may be implemented in hardware, software, or a combination of hardware and software including one or more signal processing and/or application-specific integrated circuits.

The terminal may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application does not constitute a specific limitation on the terminal. In some other embodiments of this application, the terminal may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), and the like. Different processing units may be independent devices or may be integrated into one or more processors.

A memory may be further disposed in the processor 110, and is configured to store instructions and data.

In some embodiments, the processor 110 may include one or more interfaces. The interfaces may include an inter-integrated circuit (I2C) interface, an inter-integrated circuit sound (I2S) interface, a pulse code modulation (PCM) interface, and the like.

It may be understood that the interface connection relationship between the modules illustrated in this embodiment of this application is merely an example for description, and does not constitute a limitation on the structure of the terminal. In some other embodiments of this application, the terminal may use an interface connection manner different from that in the foregoing embodiments or a combination of a plurality of interface connection manners.

The charging management module 140 is configured to receive a charging input from a charger. The charger may be a wireless charger or may be a wired charger.

The power management module 141 is configured to be connected to the battery 142, the charging management module 140, and the processor 110.

A wireless communication function of the terminal may be implemented by using the antenna 1, the antenna 2, the mobile communication module 150, the wireless communication module 160, the modem processor, a baseband processor, and the like.

The antenna 1 and the antenna 2 are configured to transmit or receive an electromagnetic wave signal.

The mobile communication module 150 may provide a wireless communication solution that is applied to the terminal and that includes 2G/3G/4G/5G and the like.

The modem processor may include a modulator and a demodulator. The modulator is configured to modulate a to-be-sent low frequency baseband signal into an intermediate or high frequency signal. The demodulator is configured to demodulate a received electromagnetic wave signal into a low frequency baseband signal.

The wireless communication module 160 may provide a wireless communication solution that is applied to the terminal and that includes a wireless local area network (WLAN) (for example, a wireless fidelity (Wi-Fi) network), Bluetooth (BT), a global navigation satellite system (GNSS), and the like. The wireless communication module 160 may be one or more devices integrating at least one communication processing module.

In some embodiments, the antenna 1 and the mobile communication module 150 of the terminal are coupled, and the antenna 2 and the wireless communication module 160 of the terminal are coupled, so that the terminal can communicate with a network and another device by using a wireless communication technology. The wireless communication technology may include a global system for mobile communications (GSM), a general packet radio service (GPRS), and the like.

The terminal implements a display function by using the GPU, the display 194, the application processor, and the like.

The display 194 is configured to display an image, a video, and the like. The display 194 includes a display panel. The display panel may be a liquid crystal display (LCD).

The terminal may implement a photographing function by using the ISP, the camera 193, a video codec, the GPU, the display 194, the application processor, and the like.

The ISP is configured to process data fed back by the camera 193.

The camera 193 is configured to capture a still image or a video. An optical image is generated for an object by using a lens and is projected onto a photosensitive element.

The digital signal processor is configured to process a digital signal, and may process another digital signal in addition to the digital image signal. For example, when the terminal selects a frequency, the digital signal processor is configured to perform Fourier transform and the like on energy of the frequency.

The video codec is configured to compress or decompress a digital video. The terminal may support one or more types of video codecs. In this way, the terminal may play or record videos in a plurality of encoding formats.

The NPU is a neural-network (NN) computing processor that quickly processes input information by referring to a biological neural network structure, for example, by referring to a transmission mode between human brain neurons, and may further perform self-learning continuously.

The internal memory 121 may include one or more random access memories (RAM) and one or more non-volatile memories (NVM).

The random access memory may include a static random-access memory (SRAM), a dynamic random access memory (DRAM), a synchronous dynamic random access memory (SDRAM), and the like.

The non-volatile memory may include a magnetic disk storage device and a flash memory.

The flash memory may include a NOR FLASH, a NAND FLASH, a 3D NAND FLASH, and the like according to an operation principle, and may include a single-level cell (SLC), a multi-level cell (MLC), and the like based on a memory cell potential level.

The random access memory may be directly read and written by the processor 110, and may be configured to store an executable program (for example, a machine instruction) of an operating system or another running program, and may be further configured to store data of a user and an application.

The non-volatile memory may further store the executable program, the data of the user and the application, and the like, which may be loaded into the random access memory in advance for directly reading and writing by the processor 110.

The external memory interface 120 may be configured to be connected to an external non-volatile memory, to expand a storage capability of the terminal.

The terminal may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to encode and decode an audio signal.

The speaker 170A, also referred to as a "horn", is configured to convert an audio electrical signal into a sound signal. The terminal may listen to music or answer a hands-free call by using the speaker 170A.

The receiver 170B, also referred to as an "earpiece", is configured to convert an audio electrical signal into a sound signal. When a call is answered or voice information is listened to by using the terminal, the receiver 170B may be put close to a human ear to listen to a voice.

The microphone 170C, also referred to as a "mic" or "mike", is configured to convert a sound signal into an electrical signal. When making a call or sending voice information, a user may make a sound by approaching the mouth to the microphone 170C, to input a sound signal to the microphone 170C.

The headset jack 170D is configured to be connected to a wired headset. The headset jack 170D may be a USB interface 130, or may be a 3.5 mm open mobile terminal platform (OMTP) standard interface or a cellular telecommunications industry association of the USA (CTIA) standard interface.

The button 190 includes a power button, a volume button, and the like. The button 190 may be a mechanical button, or may be a touch-sensitive button. The terminal may receive a button input, and generate a button signal input related to user settings and function control of the terminal.

The motor 191 may generate a vibration alert. The motor 191 may be configured to provide a vibration alert for an incoming call, and may be further configured to provide vibration feedback for a touch.

The indicator 192 may be an indicator light, may be configured to indicate a charging state or a battery change, and may be further configured to indicate a message, a missed call, a notification, and the like.

The SIM card interface 195 is configured to be connected to a SIM card.

In this embodiment of this application, the processor 110 may invoke the computer instructions stored in the internal memory 121 to enable the terminal to perform the device detection method in the embodiment of this application.

As described above, the foregoing embodiments are merely intended to describe the technical solutions of this application, but not intended to limit this application. Although this application is described in detail with reference to the foregoing embodiments, persons of ordinary skill in the art should understand that they can still make modifications to the technical solutions described in the foregoing embodiments or make equivalent replacements to some technical features thereof, without departing from the scope of the technical solutions of the embodiments of this application.

As used in the foregoing embodiments, according to the context, the term "when" may be interpreted as a meaning of "if", "after", "in response to determining", or "in response to detecting". Similarly, according to the context, the phrase "when determining" or "if detecting (the stated condition or event)" may be interpreted as "if determining", "in response to determining", "when detecting (the stated condition or event)", or "in response to detecting (the stated condition or event)".

All or some of the foregoing embodiments may be implemented by software, hardware, firmware, or any combination thereof. When the software is used for implementation, implementation may be entirely or partially performed in the form of a computer program product. The computer program product includes one or more computer instructions. When the computer program instructions are loaded and executed on a computer, all or some of the processes or functions according to the embodiments of this application are produced. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one network site, computer, server or data center to another network site, computer, server or data center in a wired (such as a coaxial cable, an optical fiber, or a digital subscriber line) or wireless (such as infrared, radio, or microwave) manner. The computer-readable storage medium may be any available medium accessible by a computer, or a data storage device such as a server or a data center, integrating one or more available media. The available medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the procedures of the methods in the embodiments are implemented. The procedures may be completed by a computer program instructing related hardware. The program may be stored in a computer-readable storage medium. When the program is executed, the procedures in the foregoing method embodiments may be included. The foregoing storage medium includes any medium that can store program code, such as a ROM, a random access memory RAM, a magnetic disk, or an optical disc.

What is claimed is:

1. A method, applied to a terminal that comprises a first sound generator and a second sound generator, wherein the method comprises:

playing a first audio signal through the first sound generator and playing a second audio signal through the second sound generator, wherein the first audio signal is an audio signal played by the terminal through the first sound generator in a first time period, and the second audio signal is an audio signal played by the terminal through the second sound generator in the first time period;

obtaining a plurality of frames of first audio signals to obtain a first audio signal sequence;

determining, based on the first audio signal sequence, that the first sound generator is damaged; and in a second time period, playing a fourth audio signal through the second sound generator, and skipping playing an audio signal through the first sound generator, wherein the second time period is after the first time period.

2. The method according to claim 1, wherein the playing the second audio signal through the second sound generator comprises:

increasing energy of the second audio signal; and playing the second audio signal with increased energy through the second sound generator.

3. The method according to claim 1, wherein after the determining, based on the first audio signal sequence, that the first sound generator is damaged, the method further comprises:

displaying a first interface, wherein the first interface comprises prompt information, and the prompt information is used to prompt a user that the first sound generator is damaged.

4. The method according to claim 1, wherein the first sound generator is disposed inside a screen of the terminal, the second sound generator is disposed on a side surface of the terminal, the first audio signal played by the first sound generator is transmitted to a human ear through a bone, and the second audio signal played by the second sound generator is transmitted to the human ear through air.

5. The method according to claim 4, wherein the first audio signal sequence comprises H frames of first audio signals obtained after the pilot signal is added, comprising a third audio signal, the third audio signal is a frame of first audio signal obtained after the pilot signal is added, and the determining, based on the first audio signal sequence, that the first sound generator is damaged comprises:

obtaining a detection signal sequence after playing the first audio signal sequence through the first sound generator, wherein the detection signal sequence comprises K frames of detection signals, comprising a first detection signal, the first detection signal is a feedback signal corresponding to a silent audio signal in the third audio signal, the silent audio signal in the third audio signal is an audio signal whose energy is less than or equal to a second energy threshold and whose frequency is equal to or greater than a frequency threshold, and the second energy threshold is greater than or equal to a first energy threshold;

determining admittance values corresponding to all the frames of detection signals in the detection signal sequence, wherein the admittance values corresponding to all the frames of detection signals comprise an admittance value corresponding to the first detection signal, the admittance value corresponding to the first detection signal is used to indicate a first admittance value of the first sound generator existing when the first sound generator plays the silent audio signal in the third audio signal, and the first admittance value is used to indicate a capability of the first sound generator to allow the silent audio signal in the third audio signal to pass;

determining an average admittance value corresponding to the detection signal sequence, wherein the average admittance value corresponding to the detection signal sequence is an average value of the admittance values corresponding to the K frames of detection signals; and when determining that the determined average admittance value corresponding to the detection signal sequence falls outside a normal admittance value range, determining that the first sound generator is damaged, wherein the normal admittance value range is a range of an admittance value of the first sound generator existing when the first sound generator plays the silent audio signal and the first sound generator is normal.

6. The method according to claim 5, wherein the obtaining the detection signal sequence after playing the first audio signal sequence through the first sound generator comprises:

obtaining a first feedback signal sequence corresponding to the first audio signal after playing the first audio signal sequence through the first sound generator, wherein the first feedback signal sequence comprises H frames of feedback signals, comprising a first feedback signal, the first feedback signal is a feedback signal corresponding to the third audio signal, the first feedback signal comprises corresponding current information and corresponding voltage information existing when the first sound generator plays the third audio signal, the first feedback signal carries information about the third audio signal, the third audio signal further comprises a non-silent audio signal, the non-silent audio signal is an audio signal whose energy is greater than or equal to a third energy threshold and whose frequency is less than the frequency threshold in the third audio signal, and the third energy threshold is greater than or equal to the second energy threshold;

filtering the first feedback signal sequence to obtain a prediction signal sequence, wherein the prediction signal sequence comprises S frames of prediction signals, S is less than or equal to H, the prediction signal sequence comprises a first prediction signal, and the first prediction signal is a first feedback signal obtained after the first feedback signal is filtered to remove information about a non-silent audio signal in the first feedback signal;

determining an admittance value corresponding to each frame of prediction signal in the prediction signal sequence; and determining all prediction signals whose corresponding admittance values are less than a silent frame admittance value in the prediction signal sequence as the detection signal sequence, wherein the silent frame admittance value is a maximum admittance value of the first sound generator existing when the first sound generator plays the silent audio signal.

7. The method according to claim 6, wherein the filtering the first feedback signal sequence to obtain the prediction signal sequence comprises:

filtering some feedback signals in the first feedback signal sequence to obtain the prediction signal sequence, wherein the some feedback signals are S frames of feedback signals collected at a later time in the first feedback signal sequence, the prediction signal sequence comprises S frames of filtered feedback signals, and S is less than H; or filtering all feedback signals in the first feedback signal sequence to obtain the prediction signal sequence, wherein the prediction signal sequence comprises S frames of filtered feedback signals, and S is equal to H.

8. The method according to claim 5, wherein the normal admittance value range is predetermined and then set in the terminal, and a process of determining the normal admittance value range comprises:

separately playing the second audio signal sequence through M samples of the first sound generator under a normal condition;

respectively obtaining corresponding second feedback signal sequences existing when the M samples play the second audio signal sequence, to obtain the second feedback signal sequences corresponding to the M samples;

respectively determining silent prediction signal sequences corresponding to the M samples based on the second feedback signal sequences corresponding to the M samples, wherein the M samples comprise a first sample, a silent prediction signal sequence corresponding to the first sample comprises a plurality of frames of silent prediction signals, comprising a first silent prediction signal, the first silent prediction signal is a filtered feedback signal that meets a first condition and that is obtained after a second feedback signal sequence corresponding to the first sample is filtered, and the first condition is that an admittance value corresponding to the filtered feedback signal is less than or equal to an admittance threshold;

respectively determining reference admittance values corresponding to the M samples based on the silent prediction signal sequences corresponding to the M samples, wherein a reference admittance value of the first sample is an average value of admittance values corresponding to all the silent prediction signals in the silent prediction signal sequence corresponding to the first sample; and determining the normal admittance value range based on the reference admittance values corresponding to the M samples.

9. The method according to claim 8, wherein the determining the normal admittance value range based on the reference admittance values corresponding to the M samples comprises:

determining a largest value in the reference admittance values corresponding to the M samples and a smallest value in the reference admittance values corresponding to the M samples; and determining that the normal admittance value range is from the smallest value in the reference admittance values to the largest value in the reference admittance values.

10. The method according to claim 8, wherein the silent frame admittance value is predetermined and then set in the terminal, and a process of determining the silent frame admittance value comprises:

determining average reference admittance values of M samples of the first sound generator under different conditions, wherein the different conditions comprise the normal condition and at least one abnormal condition, an average reference admittance value of the M samples under the normal condition is an average value of reference admittance values corresponding to the M samples under the normal condition, and an average reference admittance value of the M samples under the abnormal condition is an average value of reference admittance values corresponding to the M samples under the abnormal condition; and determining the silent frame admittance value based on the average reference admittance values of the M samples of the first sound generator under the different conditions.

11. The method according to claim 10, wherein the determining the silent frame admittance value based on the average reference admittance values of the M samples of the first sound generator under the different conditions specifically comprises:

determining that a largest value in the average reference admittance values of the M samples of the first sound generator under the different conditions is the silent frame admittance value.

12. The method according to claim 1, wherein the obtaining the plurality of frames of first audio signals to obtain the first audio signal sequence comprises:

adding a pilot signal to each frame of the first audio signal to obtain the first audio signal sequence, wherein the pilot signal is an audio signal whose frequency is greater than a frequency threshold and whose energy is less than a first energy threshold.

13. The method according to claim 12, wherein the frequency threshold is greater than a frequency of the first audio signal, and the first energy threshold is close to −30 dB or equal to −30 dB.

14. A terminal, comprising:
a first sound generator;
a second sound generator;
one or more processors; and
a memory that is coupled to the one or more processors, wherein the memory is configured to store computer program code, the computer program code comprises computer instructions, and the one or more processors invoke the computer instructions to enable the terminal to perform operations comprising:

playing a first audio signal through the first sound generator and playing a second audio signal through the second sound generator, wherein the first audio signal is an audio signal played by the terminal through the first sound generator in a first time period, and the second audio signal is an audio signal played by the terminal through the second sound generator in the first time period;

obtaining a plurality of frames of first audio signals to obtain a first audio signal sequence;

determining, based on the first audio signal sequence, that the first sound generator is damaged; and in a second time period, playing a fourth audio signal through the second sound generator, and skipping playing an audio signal through the first sound generator, wherein the second time period is after the first time period.

15. A chip system, wherein the chip system is applied to a terminal, the chip system comprises one or more processors, and the one or more processors are configured to invoke computer instructions to enable the terminal to perform operations comprising:

playing a first audio signal through a first sound generator included in the terminal and playing a second audio signal through a second sound generator included in the terminal, wherein the first audio signal is an audio signal played by the terminal through the first sound generator in a first time period, and the second audio signal is an audio signal played by the terminal through the second sound generator in the first time period;

obtaining a plurality of frames of first audio signals to obtain a first audio signal sequence;

determining, based on the first audio signal sequence, that the first sound generator is damaged; and in a second time period, playing a fourth audio signal through the second sound generator, and skipping playing an audio signal through the first sound generator, wherein the second time period is after the first time period.

* * * * *

UNITED STATES PATENT AND TRADEMARK OFFICE
CERTIFICATE OF CORRECTION

| | |
|---|---|
| PATENT NO. | : 12,294,830 B2 |
| APPLICATION NO. | : 18/268460 |
| DATED | : May 6, 2025 |
| INVENTOR(S) | : Xu et al. |

Page 1 of 1

It is certified that error appears in the above-identified patent and that said Letters Patent is hereby corrected as shown below:

In the Claims

Claim 11, Column 55, Lines 20-21: "first sound generator under the different conditions specifically comprises:" should read -- first sound generator under the different conditions comprises: --.

Signed and Sealed this
Tenth Day of June, 2025

Coke Morgan Stewart
*Acting Director of the United States Patent and Trademark Office*